(12) United States Patent
Guler et al.

(10) Patent No.: US 7,403,911 B2
(45) Date of Patent: *Jul. 22, 2008

(54) METHOD AND SYSTEM FOR SETTING AN OPTIMAL PREFERENCE POLICY FOR AN AUCTION

(75) Inventors: Kemal Guler, Cupertino, CA (US); Tongwei Liu, Brooklyn, NY (US); Hsiu-Khuern Tang, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 879 days.

This patent is subject to a terminal disclaimer.

(21) Appl. No.: 09/902,880

(22) Filed: Jul. 10, 2001

(65) Prior Publication Data

US 2003/0018515 A1 Jan. 23, 2003

(51) Int. Cl.
*G06Q 30/00* (2006.01)
(52) U.S. Cl. .............................. 705/26; 705/14; 705/27; 705/37
(58) Field of Classification Search .................... 705/7, 705/14, 26, 27, 37
See application file for complete search history.

(56) References Cited

U.S. PATENT DOCUMENTS

| 6,021,398 | A | * | 2/2000 | Ausubel | 705/37 |
| 6,131,087 | A | * | 10/2000 | Luke et al. | 705/26 |
| 6,161,099 | A | * | 12/2000 | Harrington et al. | 705/37 |
| 6,415,270 | B1 | * | 7/2002 | Rackson et al. | 705/37 |
| 6,629,082 | B1 | * | 9/2003 | Hambrecht et al. | 705/37 |
| 2003/0014346 | A1 | * | 1/2003 | Zhang | 705/37 |

OTHER PUBLICATIONS

Kisiel-Dorohinicki et al, May 30th, 2001 "Applying Mechanism of Crowd in Evolutionary MAS for Multiobjective Optimization", Universite Libre De Bruxells, Faculte Des Science.*
Bajari et al. Auction Models When Bidders Make Small Mistakes: Consequences for Theory and Estimation, Aug. 15, 2001.*
Hendricks et al. "A Survey of Recent empirical work concerning auction", Canadian Journal of Economics, vol. 28, No. 2 (May 1995), pp. 403-426.*
Miyagiwa, Kaz; "Oligopoly and Discriminatory Government Procurement Policy", The American Economic Review. Nashville: Dec. 1991. vol. 81, Iss. 5; p. 1320, 9 pgs extracted from Proquest database on INternet on Jun. 7, 2007.*
Stevens, Sarah A., Ph.D.; "Preferential procurement in Canada: Economic cost for political benefit?", The Johns Hopkins University, 1988, 323 pages; extracted from Proquest database on INternet on Jun. 7, 2007.*

* cited by examiner

Primary Examiner—Yogesh C Garg

(57) ABSTRACT

One embodiment of the present invention provides a method and system that determines the optimal preference policy for a market, such as an auction, with respect to a multiplicity of possible evaluation criteria that auction participants or other end users specify. In one embodiment, a method and system that configures the optimal preference policies that can be implemented in any market, particularly an auction, applicable to any auction format a market decision maker may wish to conduct. An embodiment of the present invention estimates bidders' private information and correspondingly identifies exploitable asymmetries to implement a preferential treatment policy. In one embodiment, this method is implemented on a computer system, under the control of software and firmware directing the operation of its processor and other components. In one embodiment, a computer readable medium causes a computer system to execute the method.

21 Claims, 15 Drawing Sheets

AUCTION CHARACTERISTICS:
    Auction ID
    Item ID
    Item Name
    Quantity
    Dates:
        Announcement
        Start
        Close
    Seller/Buyer ID
    Auction Mechanism Characteristics
    Invited Bidders' IDs
    Participating Bidders' IDs and Bids Quantities
    Outcome:
        Assigned Price for each bidder
        Assigned Quantities for each bidder
    Fees:
        Shipping & Handling
        Taxes
        Auctioneer Fees:
            Posting Fee
            Ad Valorem Fee BIDS:
    Bid ID
    Auction ID
    Item ID
    Bidder ID
    Bid Time Stamp
    Price Bid FIGURE 11 (sh. 1)

Bit Type
> Proxy
> Direct

Quantity Desired

Minimum Quantity

Currency

MECHANISM CHARACTERISTICS:

Format
> English
> Dutch
> Sealed Bid First Price
> Sealed Bid Second Price
> Vickrey
> etc.

Buy/Sell

Entry Rule
> Open
>> Free
>> Fee
> Invitation
>> Free
>> Fee

Reserve Price
> Secret
> Open

Start Price

Bid Increment
> Fixed
> Relative

FIGURE 11 (sh. 2)

Closing Rule
    Inactivity Time
    Fixed Closing Time

ITEM CHARACTERISTICS
    Item ID
    Name
    Description
    Location
    SKU
    Manufacturer
    Model number
    Condition
    Warranty
    Weight
    Weight Unit
    Measurement Unit
    Currency
    list price
    etc BIDDER CHARACTERISTICS:
    ID
    Segment ID
    Name
    Address
    General Information
    Socio Demographic Information
    Etc

FIGURE 11 (sh.3)

SELLER/BUYER CHARACTERISTIC
- Seller/Buyer ID
- Name
- Address
- General Information
- Socio Demographic Information
- Etc.

FIGURE 11 (sh. 4)

METHOD AND SYSTEM FOR SETTING AN OPTIMAL PREFERENCE POLICY FOR AN AUCTION

BACKGROUND OF THE INVENTION

1. Field of the Invention

The present invention relates to the field of computer-based auction design and analysis processes. Specifically, the present invention relates to a method and system for setting an optimal price preference policy for an auction.

2. Related Art

Modern electronic forum based auctions, such as World Wide Web and other Internet based auctions have complex rules with varied and observable characteristics and situations, as well as unobservable structural elements. Auction participants, either sellers or buyers, must make a number of decisions relating to the auction.

Sellers, for example, conducting an auction to sell an item, can improve the auction outcome in their favor by treating bidders with identifiable differences differently. Buyers, correspondingly conducting an auction to buy an item, can also improve the auction outcome in their favor by treating bidders with identifiable differences differently.

Participants entering a market, such as bidders in an auction, differ greatly across a wide spectrum of dimensions. Other market participants, large scale purchasers such as governments or large scale sellers such as major corporations, for example, deal with different bidders entering a market in a variety of differing ways. Illustratively, the United States government offers a 6% price preference for domestically produced U.S. products under legislation mandating what is commonly known as a "Buy-American" policy. Governments of the various states and of other nations have similar policies.

The operation of these price preference policies may be illustrated by the following example. The U.S. Department of Defense offers a 50% price preference to U.S. domestic firms bidding to supply Defense Department purchases. Non-U.S. bidders are at a daunting bidding disadvantage in this situation. Foreign bidders are discriminated in favor of the substantially preferred domestic U.S. firms. If any domestic U.S. supplier's bid is no more than 50% higher than the lowest foreign bid, the domestic bid is accepted. In other words, the preferred domestic U.S. supplier wins in any such auction with the U.S. Department of Defense against a foreign bidder who, without the preference policy in place, would win with a bid of nearly half the sale price.

In business-to-business settings, often less legislatively constrained than governmental market situations, such preferential treatment of some suppliers, with corresponding discrimination against others, is even more prevalent. Similarly, in many business-to-consumer situations, a seller may wish to treat some segment of customers, sharing some particular trait, differently from others. For example, certain customers may be treated preferentially by businesses and other customers discriminatorily.

Illustratively, "loyal" customers, e.g., customers with frequent or repeated significant orders, bidders with better bidder ranking criteria, e.g., higher eBay® ratings, and customers with identifiably more elastic demands, etc., may be treated preferentially by awarding them a price discount. Similarly, mortgage customers or other borrowers with excellent credit ratings may be awarded a lower interest rate. Conversely, new, e.g., unknown customers, inflexibly rigid customers with stringent accommodation demands, or borrowers with lower credit ratings may represent to a business a higher cost or degree of risk in dealing with them. Such riskier or costlier customers may be discriminated against with higher interest rates, requiring premium prices, or in other handicapping ways.

Setting price preference policies in markets, particularly in auctions, can improve the market outcome in favor of the policy setting market participant, and is thus an important, perhaps crucial business consideration. Currently, these decisions are made by auction participants on an ad hoc basis, sometimes with the assistance of consultants operating themselves on a more or less ad hoc basis. A high degree of uncertainty intrinsic in auction price preference policy related decision making often precludes optimal outcomes, because the soundness of a particular decision in a particular situation cannot be ascertained prior to observation of the outcome (e.g., after the transaction has taken place). Inexperienced auction participants often make unsophisticated sub-optimal decisions regarding the setting of a price preference policy. Experience and a host of other human elements may thus effect the soundness of decision making in a given auction price preference situation. Nevertheless, no conventional systematic auction price preference analytical decision making mechanism is available.

Currently, the decisions on the parameters of preference policy are left entirely to the person conducting the auction. There is little systemic data analysis to guide these decisions. Given the multiplicity of items bought/sold through auctions, it is typically too costly to hire expert analysis to configure the price-preference policies for each case. Typically, a given policy, say 10% preference for preferred suppliers, is applied to a large class of procurement situations. Yet bidders' cost distributions vary considerably across procurement items and across time. A fixed preference policy is rarely optimal for every case to which it is applied.

As is known, the outcome of an auction (e.g., who gets what, who pays how much) is determined by bidding behavior of bidders. Bidding behavior depends on, among other factors, the auction rules in that different auction rules induce different behavior on the part of the bidders. A bidder's behavior under a given collection of auction rules in turn is determined by the bidder's private information. The structure of the private information held by the bidders is thus a key factor in evaluating alternative auction rules. This fundamental element of the auction environment is not directly observable and has to be estimated from observable and available data.

There exists a need for an automated estimation and optimization solution for configuring the parameters of preference policies to be implemented in auctions. What is needed is a method and/or system that configures the optimal preference policies that can be combined with any auction format a market decision maker may wish to conduct. What is also needed is a method and/or system that applies to any auction participants, either buyers conducting an auction to procure an item, or a seller, conducting to sell an item, which estimate's bidders private information and correspondingly identifies exploitable asymmetries. Further, what is needed is a method and/or system that achieves the foregoing to implement a preferential treatment policy.

SUMMARY OF THE INVENTION

An embodiment of the present invention provides a method and system that configures the optimal preference policies that can be implemented in any market, particularly an auction, that can be combined with any auction format a market decision maker may wish to conduct. An embodiment of the present invention provides a method and system that applies to any auction participants, either buyers conducting an auction to procure an item, or a seller, conducting an auction to sell an item, which estimates bidders' private information and correspondingly identifies exploitable asymmetries. Further, an embodiment of the present invention provides a method and system that achieves the foregoing to implement a preferential treatment policy.

In one embodiment, the present invention provides a method and system that estimates bidder's private information, and correspondingly identifies exploitable asymmetries between market participants by which preferential treatment policies may be implemented. In one embodiment, structural analysis of bid data from prior auctions is used to identify and estimate the distributions of bidders' private signals, conditional on observable bidder characteristics.

In one embodiment, the estimated distributions of bidders' signals, identified by structural analysis, are examined to identify significant asymmetries across the population of bidders that can be used to personalize, e.g., to particularize, design parameters for the auction to be conducted. In one embodiment, these parameters include, but are not limited to, reserve prices, entry fees, winner determination rules, and payment rules of the auction to be conducted.

In one embodiment, a computer system executes, under the control of software and firmware directing the operation of its processor and other components, a process that estimates bidder's private information, and correspondingly identifies exploitable asymmetries between market participants by which preferential treatment policies may be implemented.

In one embodiment, a computer readable medium causes a computer system to execute the steps in a method for implementing a process that estimates bidder's private information, and correspondingly identifies exploitable asymmetries between market participants by which preferential treatment policies may be implemented.

These and other objects and advantages of the present invention will become obvious to those of ordinary skill in the at after reading the following detailed description of the preferred embodiments which are illustrated in the drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

FIG. 11 (sheets 1-4) depicts contents of a database of market data, in accordance with an embodiment of the present invention.

DETAILED DESCRIPTION OF THE INVENTION

In the following detailed description of the present invention, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions, which follow, are presented in terms of procedures, steps, logic blocks, processing, and other symbolic representations of operations on data bits that can be performed by computer systems. These descriptions and representations are used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical, electronic, magnetic, optical, and/or electro-optical signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing" or "calculating" or "constraining" or "estimating" or "evaluating" or "expressing" or "inputting" or "outputting" or "predicting" or "ranking" or "receiving" or "retrieving" or "selecting" or "substituting" or "transforming" or "promulgating" or the like, refer to the action and processes of a computer system, or similar electronic computing device, that manipulates and transforms data represented as physical (electronic) quantities within the communications and computer systems' registers and memories into other data similarly represented as physical quantities within the computer system memories or registers or other such information storage, transmission, or display devices.

Figure 4:
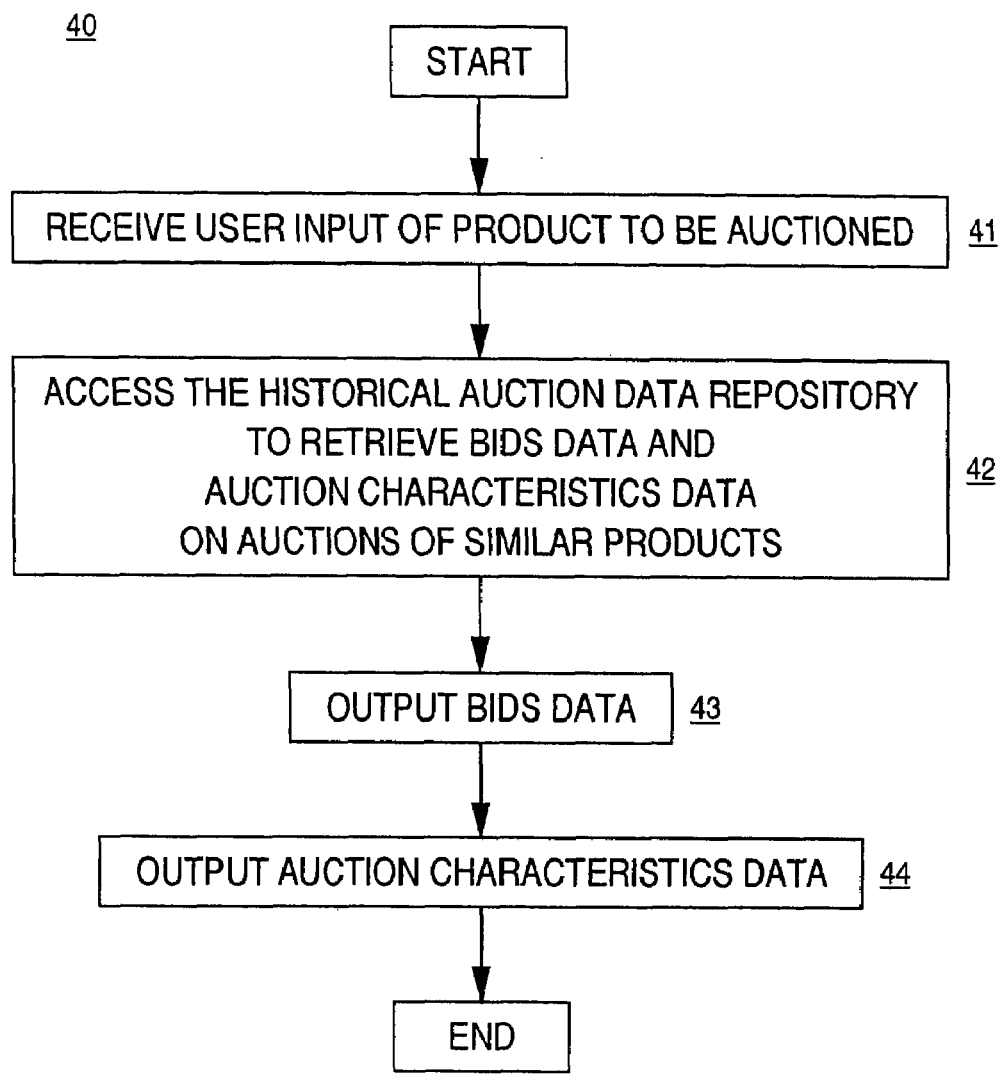
FIG. 4 is a flow chart of steps in a process for generating auction characteristics data, in accordance with one embodiment of the present invention.

Certain portions of the detailed descriptions of the invention, which follow, are presented in terms of processes (e.g., process 40, FIG. 4). These processes are, in one embodiment, carried out by processors and electrical and electronic components under the control of computer readable and computer executable instructions. The computer readable and computer executable instructions reside, for example, in registers and other features of processors, memories, and data storage features of computers executing programs and processes. However, the computer readable and computer executable instructions may reside in any type of computer readable medium. Although specific steps are disclosed in figures herein describing the operations of processes (e.g., FIG. 4; describing process 40), such steps are exemplary. That is, the present invention is well suited to performing various other steps or variations of the steps recited in the flowcharts of the figures herein. Further, it is appreciated that the steps of these processes may be performed by software or hardware or any combination of software and hardware.

The present invention is discussed primarily in the context of a method for determining an optimal preference policy for a market structure, such as an auction, with respect to a multiplicity of possible market participants, such as auction participants like sellers and bidders, or other end users specify. In the following discussion, a market analysis system, especially applicable to auctions will first be discussed in a general context, after which, specific explanations will be made to applying the system to selecting optimal preference policies.

Exemplary System

Exemplary Automated Decision Support System in General

Figure 1:
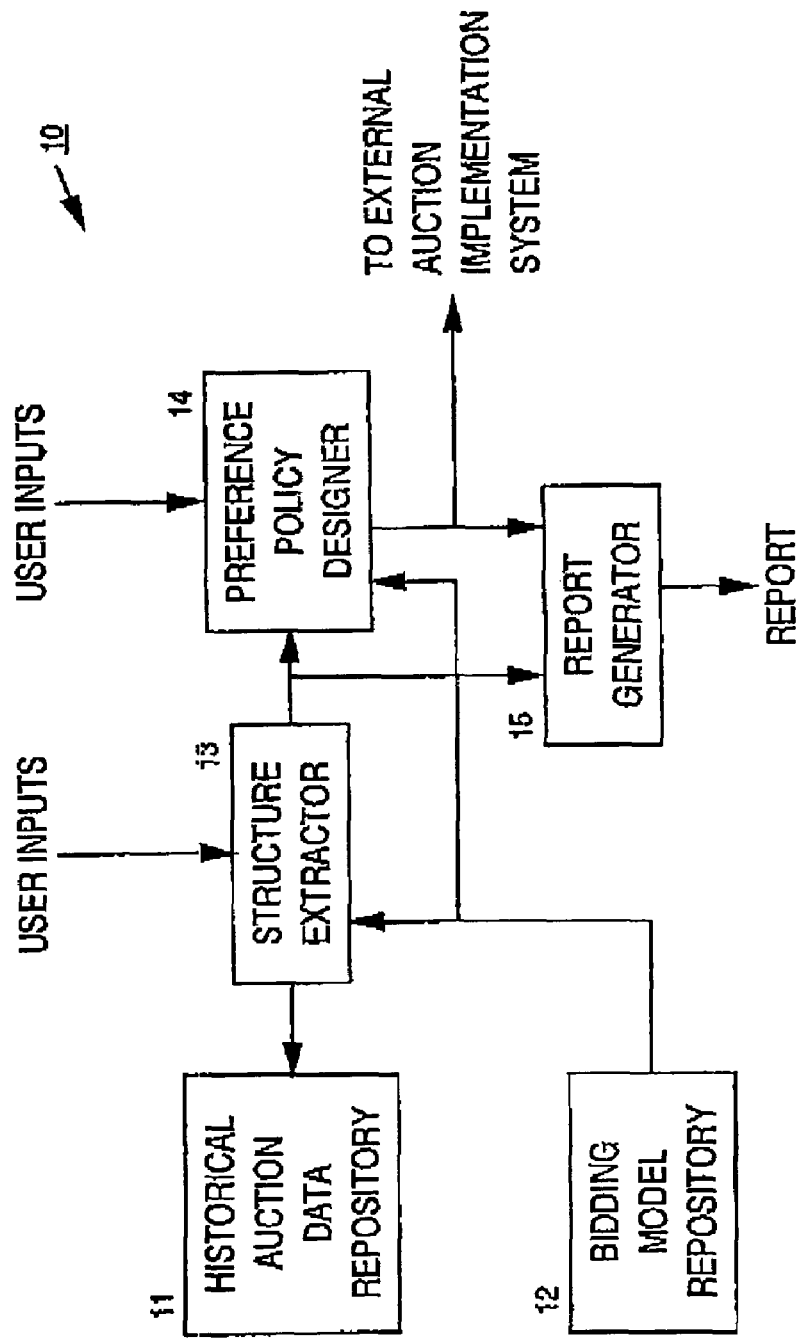
FIG. 1 schematically shows an automated decision support system for designing auctions in accordance with an embodiment of the invention.

FIG. 1 shows an automated decision support system 10 for designing auctions in accordance with one embodiment of the present invention. In one embodiment, the automated decision support system 10 is a software system implemented in a computer system. Alternatively, the automated decision support system 10 can be implemented by hardware or firmware.

The computer system that embodies the automated decision support system 10 can be any kind of computer system. For example, the computer system can be a main-frame computer system, a super computer system, a workstation computer system, a server computer system, or a personal computer system.

The automatic decision support system 10 is used to provide decision support for auction design. This means that the automatic decision support system 10 aids auction sellers, buyers, bidders, or auction houses in making auction-related decisions. As described above, there are typically a number decisions to be made regarding an auction. For example, in an auction run by a seller, a bidder has to decide on (1) how to bid and (2) whether or not to bid in a specific auction conditional on information the bidder has. In addition, the bidder needs to decide whether or not and how to gather information on auctions, objects, rivals. The auction house for the auction needs to decide fees for buyers and/or sellers. In addition, the auction house needs to decide the menu of auction mechanism to offer.

Similarly, in an auction run by a seller, the seller also has to decide what the reserve price of the auctioned item should be, what is the best auction format, what entry fees should be charged for participating in the auction, what timing and duration of the auction should be, the quantity of the item to be auctioned, what participation rules should govern the auction, and what information rules should be imposed to the auction, etc. As is known, these decisions affect the revenue or profit generated from the auction.

In order to achieve the maximum revenue or profit, these decisions must be optimized. In accordance with an embodiment of the present invention, this optimization is done by automatic decision support system 10. Automatic decision support system 10 provides optimal configuration of auction design parameters and comparative evaluation of any pair of design choices. In other words, automatic decision support system 10 provides automated auction analysis optimization.

In accordance with an embodiment of the present invention, automatic decision support system 10 processes available data using structural econometric techniques to identify latent distribution of random or unknown elements of a market structure or market environment of a particular auction. In addition, automatic decision support system 10 provides the optimal values of any subset of the decision variables or candidates based on an evaluation criterion specified by a user of system 10 conditional on levels of the remaining decisions.

The available data to the automatic decision support system 10 include data supplied by the user of the system 10. The data include description of the item to be auctioned, auction decision candidates, constraints, and auction evaluation criterion. These are user inputs to the automatic decision support system 10. The available data also include historical auction data and bidding model data. The historical auction data and the bidding model data are stored in the automatic decision support system 10.

The automatic decision support system 10 receives the user inputs of the description of the item to be auctioned, the auction decision candidates, the constraints, and the auction evaluation criterion. The automatic decision support system 10 then selects the best auction decision candidates (e.g., the best auction format is English, the reserve price is $100, the entry fee is $5, and the duration is five days) among the inputted auction decision candidates based on the auction evaluation criterion and the estimated market structure of the auction.

The market structure affects bidding behavior of bidders during the auction. As is known, bidding behavior determines the outcome of an auction. The outcome of an auction means who gets what and who pays how much, etc. Different auction rules induce different bidding behavior on the part of bidders. A bidder's behavior under a given set of auction rules in turn is determined by his private information. The structure of private information held by bidders is thus a key factor in evaluating alternative auction procedures (e.g., auction format, reserve prices, entry fees, timing and duration of the auction, quantity, participation rules, and information rules, etc.) from the point of view of a seller (or buyer) trying to sell (or procure) an item by auctioning. This fundamental element of an auction environment is not directly observable and has to be estimated from observable and available data. The auction procedures can also be referred to as auction mechanisms. They include the characteristics of the auction.

In accordance with an embodiment of the present invention, automatic decision support system 10 estimates the unknown or unobservable elements of the market structure of the auction by extracting the joint distribution of private information of the bidders (e.g., the probability distribution of bidders' willingness to pay, the probability distribution of the number of potential bidders) from bid data extracted from the historical auction data of similar auctions. In particular, automatic decision support system 10 estimates the unknown elements of the market structure by (1) expressing unobservable variables in the bidding model in terms of the observable bid data, and (2) applying known statistical density estimation techniques to the expression so as to obtain an estimation of the unknown elements. In doing so, automatic decision support system 10 enables the user (either a seller or a buyer) of system 10 to factor the distribution of bidders' private information into his or her decisions regarding the appropriate auction procedure to conduct the auction.

With the estimated unknown elements of the market structure and other user inputs (e.g., the auction design candidates, evaluation criterion), the automatic decision support system 10 provides optimized auction design candidates based on the evaluation criterion provided such that maximized expected revenue or profit from the auction can be achieved. This means that the automatic decision support system 10 can be used to configure optimized auction parameters for a multiplicity of performance criteria. The structure and operation of the automatic decision support system 10 will be described in more detail below, also in conjunction with FIGS. 1 through 10.

As can be seen from FIG. 1, automatic decision support system 10 includes a historical auction data repository 11, a bidding model repository 12, a structure extractor 13, a behavior predictor 14, and an optimizer 15. The historical auction data repository 11 stores historical auction data for previous auctions. The historical auction data specify auction characteristics and/or mechanisms of previous auctions. This means that the historical auction data includes the bid data and the auction characteristics data of each of the stored previous auctions. The auction characteristics data specify the auction procedure of the auction. Thus, the auction characteristics data of an auction describe the reserve price of the auctioned item, the auction format, the number of bidders, etc. of the particular auction. The bid data of an auction describe the bidding behaviors of bidders in the auction. The bid data is a record that typically contains the auction identifier, number of bidders N, number of bids, transaction price, winner, reserve price, auction format, item characteristics, and bidder characteristics. Both the bid data and the auction characteristics data are extracted from the auction data of the previous or historical auctions for various items. The historical auction data repository 11 can be implemented using any known database technology.

The bidding model repository 12 stores various bidding models. A bidding model specifies a bidding behavior pattern. It is a function of auction characteristics or procedure of the corresponding auction. It is also a function of the market structure of the auction. For example, a Dutch auction bidding model specifies bidding behavior in a Dutch format auction. An English auction bidding model specifies bidding behavior in an English format auction. A first-price-sealed-bid auction bidding model specifies bidding behavior in a first-price-sealed-bid auction. The bidding model repository 12 can be implemented using any known database technology. Several examples of bidding models are provided in detail below.

The structure extractor 13 is used to estimate the unknown elements of the market structure of the auction. The structure extractor 13 first receives the user input of the item (and its characteristics) to be auctioned. The structure extractor 13 then accesses the repository 11 for the bid data and auction characteristics data observed in previous or historical auctions of similar items of the item. The structure extractor 13 is connected to the historical auction data repository 11 and the bidding model repository 12. The structure extractor 13 then produces a non-parametric structural estimate of the unobservable latent structure of the environment of the auction. The structure extractor 13 uses auction theory and non-parametric statistical methods to extract an estimate of the latent structure from the previously observed bids.

Exemplary System Applied to Optimizing a Preference Policy

With reference still to FIG. 1, automated decision support system 10 effectuates configuring optimal preference policies in accordance with one embodiment of the present invention. In one embodiment of the present invention, the automated decision support system 10 analyzes available data using structural econometric techniques, as discussed above, to estimate the unknown distribution of private information held by bidders. In addition, the system of the present embodiment provides the optimal values of the decision variables based on an evaluation criterion specified by the user of the system. System 10, as effectuated by the present embodiment, has three major functional components in optimizing an auction preference policy. The first is structural modeling and estimation module 13. The second is a preference policy design module 14, and the third is a report generation module 15. In an alternative embodiment, another combination of components with functions duplicative of the forgoing may effectuate this functionality.

Structural Modeling and Estimation

The first functionally active component of automated decision support system (FIG. 1) of an embodiment of the present invention, structure extractor 13 effectuates the estimation of the distributions of private signals of bidders from bid data in prior auctions allows for possible asymmetries across identifiable bidder groups to be recognized.

Preference Policy Design

Referring still to FIG. 1, the preference policy design component 14 configures the optimal preference policy to be used in the auction to be conducted. Policy design is performed for a wide variety of user specified evaluation criteria. In the case of a buyer running an auction to procure an item this collection of criteria may include, but is not limited to, the buyer's short-term expected procurement cost, system efficiency, long-term expected procurement cost, and joint expected payoff of the buyer and a subset of bidders, etc. In the case of a seller running an auction to sell an item, the evaluation criterion may be the seller's expected profit, system efficiency, or the joint expected payoff of the seller and a subset of bidders.

An end-user inputs a specific performance criterion to be optimized by possibly combining these elements. The end-user is also allowed to specify a collection of constraints. The end-user inputs the constraints on the auction mechanisms to be evaluated. Examples of such constraints include, but are not limited to, the following two. First, the end-user may restrict the auction format to a sealed-bid first-price format and may wish to choose the personalized reserve prices for different bidder groups optimally. Second, the end-user may wish to use an English auction combined with a linear bid comparison rule to treat a group of bidders favorably; the parameters of the linear rule are to be selected to optimize the stated objective function.

Report Generation

Again referring to FIG. 1, the expected performance level associated with the best policy and alternative policies as well as expected variation in the performance level are reported by a report generator 15. Alternatively, given a preference policy, for example, a 10% preference for an unspecified group of bidders and 0% for the remaining bidders, the selection module identifies the best group of bidders that should be treated preferentially.

System 10 maintains, in one embodiment, two data repositories. As depicted in FIG. 1, these include a repository 11 of historical auction data for a multiplicity of goods and services, and a repository 12 of bidding models for a multiplicity of auction mechanisms and a multiplicity of market environments. For optimizing a preference policy, in the present embodiment, system 10 uses data from both historical auction data repository 11 and bidding model repository 12 as inputs.

Historical auction data repository 11 contains data on past auctions. Historical auction data repository can be implemented using any known database technology. For the purposes of illustrating the principles of one embodiment of the present invention, each record in the database is assumed to contain the variables listed in Table A, below.

TABLE A

Auction:

Auction ID
Auctioned Item:

Item ID
Name
Quantity
Description
Mechanism:

Auction Format
Reserve price
Bidders:

Bidder ID
Segment ID
Bids:

Identities of participating bidders
Bids submitted by participating bidders
Outcomes:

Assigned payments for each bidder
Assigned quantities for each bidder

For each bidder, the database contains a segment identity (ID). Alternatively, in another embodiment, further data on bidder-specific covariates that can be used for classifying the bidders and assigning segment identifiers. Some examples are e-bay rating, consumer individual flexibility rating, credit worthiness, income, occupation, or residential locale, and other special individualized ratings.

Bidding model repository 12 stores a variety of bidding models. The bidding model repository can also be implemented using any known database technology.

A bidding model specifies bidding behavior as a function of information held by a bidder and the characteristics of the market structure. The market structure can be decomposed into two parts. These are the characteristics of the auction mechanism and the characteristics of the environment. These terms are explained in detail as follows.

Part of the information held by a bidder is inherently private, that is, is known only by the bidder himself/herself and not observed by other participants. For example, a bidder's willingness to pay for the auctioned item is known only by the bidder himself/herself. Another example of private information is that, in a procurement auction for a project, each bidder typically has private information about the cost he/she would incur to deliver the project if he/she wins the auction. From the point of view of other participants, the private information of an exemplary bidder "i" is a random variable with some probability distribution.

By a market structure we mean a collection of variables that describe the factors that may affect the bidding behavior of bidders. A market structure is characterized by two sets of variables. The first set of variables collectively describes the auction "environment," and the second set of variables collectively describes the auction "mechanism."

The first set of variables provides a description of the auction "environment." These variables include the number and other characteristics of bidders, the number and other characteristics of the auctioned item. For illustrative purposes only, the number of items auctioned in the following discussion is one. This is not to be construed as limiting in any way; an embodiment of the present invention may be applied to the auctioning of any number of items.

In an auction with k groups of bidders with $n_i$ bidders in group i where i=1, 2, . . . , k, let $F_i(v)$ denote the cumulative distribution of private signal of a representative bidder in group i. Here, v denotes a bidder's private signal (typically interpreted as bidder i's willingness to pay for the item, e.g., bidder j's "valuation" of the item). The interval $(a_j, z_i)$ denote the range of possible values for this random variable for bidder group i.

For the purposes of illustrating the principles of one embodiment of the present invention, the auction "environment" can be denoted by a list like [k, $(n_i, F_1, (a_1, z_1))$, $(n_2, F_2, (a_2, z_2))$, $(n_3, F_3, (a_3, z_3))$, . . . , $(n_k, F_k, (a_k, z_k))$]. This list describes the number of bidder groups and the number of bidders and signal distribution of a typical bidder in each group.

The key challenge faced by the end-user of the system is that at least some elements of the market structure that describe the auction environment, namely, the distributions of bidders valuations are unobservable. Such unobservable elements are latent, and must be estimated from observable bid data on past auctions of similar items. Again, for the purposes of illustrating the principles of one embodiment of the present invention, the number of bidder groups (k) and the number of bidders in each group $(n_1, n_2, \ldots, n_k)$ are observable, and the distributions of bidders unobservable. The unobserved elements of the market environment are its latent structure.

A second set of variables collectively describes characteristics of the market mechanism in use. These variables include auction format (which may be English, Dutch, Vickrey, Sealed-Bid First-Price, etc.), preference policy, reserve price (e.g., the lowest acceptable bid in an auction for selling an item; the highest acceptable bid in an auction for procuring an item), starting price, entry rule, bid increment rule, closing rule etc.

Representing Market Mechanism Attributes Using Lists

As is well known in the art, holding everything else fixed, any variation in any of the dimensions of the auction mechanism can, in principle, result in variations in the submitted bids. For the purposes of illustrating the principles of one embodiment of the present invention, mechanism characteristics can be represented by a list.

In a first example, the list
(Format=Dutch, Reserve Price={$150 per item for Bidder Group 1, $100 per item for Bidder Group 2, . . . }, Entry Rule=(By Invitation, Free), Start Price=$500, Bid Increment=−$1/second, Closing Rule=n/a)

describes a Dutch auction with a preference policy in which the bidders are the ones invited to participate in the auction, the price starts at $500 and is reduced at a rate of $1 per second until an eligible bidder claims the item at the current price. All bidders are eligible until the price reaches $150; once the price goes below $150 bidders in group 1 are dropped from the list of eligible bidders. If the price reaches $100 without any bidder claiming the item, the bidders in group 2 are also dropped from the eligible bidders list. The auction stops when any currently eligible bidder claims the item or the price reaches the lowest price in the Reserve Price list.

In a second example, the list (Format=Vickrey, Reserve Price=0, Entry Rule={By Invitation, Free}, Start Price=n/a, Bid Increment=n/a, Closing Rule=n/a)

describes a standard Vickrey auction with a reserve price of 0. A Vickrey auction is a sealed bid auction in which the highest bidder wins the auctioned item, and pays the second highest bid or the reserve price whichever is higher.

In a third example, the list (Format=Sealed Bid First Price, Reserve Price=$150 per item, Bid Comparison Rule=NULL, Start Price=n/a, Entry Rule={Open, Fee=$5}, Closing Rule=n/a)

describes a standard sealed-bid first-price auction in which anyone who pays $5 entry fee (and otherwise qualifies) can submit a bid, which is required to be no less than $150, anytime during a specific time period. At the end of the specified period, the bidder who submitted the highest bid wins the item and pays what he bid. In this example all bidders are treated symmetrically.

The following examples illustrate the same auction mechanism with preference policies in the form of bid comparison rules taken with two groups (e.g., segments) of bidders.

In a fourth example, the bid comparison rule effectuated is $$\{T_1(B), T_2(B)\}=\{B, 10+B\}.$$

According to this rule bids from bidders in group 1 are transformed by the identity function $$T_1(B)=B$$

(e.g., not transformed), and the bids from bidders in group 2 are transformed by the function $$T_2(B)=10+B$$

(e.g., by adding $10 to the submitted bid). The winner of this auction is the bidder with highest transformed bid. In this example, a bidder from group 1 wins if and only if he is the highest bidder in group 1 and his bid at least $10 more than highest bid from group 2.

In a fifth example, the bid comparison rule is $$\{T_1(B), T_2(B)\}=\{B, 1.20B\}.$$

In this case, bids from group 2 bidders are transformed by multiplying the submitted bid by 1.20. In this case, the highest bidder from group 1 needs to bid 20% more than the highest bid from group 2 in order to win.

In a sixth example, the bid comparison rule is $$\{T_1(B), T_2(B)\}=\{B, H(B)\}.$$

In this case, bids from group 2 bidders are transformed by multiplying the submitted bid by a function H(B). The highest bidder group 1 needs to bid more than H (the highest bid from group 2) in order to win. If the bid comparison function is such that $$H(B)>B$$

for all values of B, then bidders in group 1 are favored. If $$H(B)<B$$

for all values of B then bidders in group 2 are favored.

In a seventh example, the preference policy may be restricted to the reserve prices, only. In this case a reserve price is specified for each bidder group. The rule $$\text{Reserve Price}=\{R_1, R_2\}=\{\$200, \$100\}$$

indicates a situation where a bidder in group 1 cannot win with a bid less than $200, and a bidder from group 2 should bid at least $100.

Representative Bidding Models

A bidding model for an n bidder auction with a given mechanism characteristics and a given environment specifies n bid functions, $(\beta_1, \beta_2, \ldots, \beta_n)$, one for each bidder. A bidder's bid function is a relation between the private signal of the bidder and the bid he/she submits. Some examples are as follows, wherein V denotes a dummy variable indicating the private valuation of a bidder, and $\beta_j$ (V, mechanism characteristics, environment) denote the bid function of bidder j.

In a first example, a Vickrey auction for the sale of an item is illustrated by the following exemplary bidding model.

$\beta_j$(V, {Format=Vickrey, Reserve Price=R}, [2, ($n_1$, $F_1$, ($a_1$, $b_1$)), ($n_2$, $F_2$, ($a_2$, $b_2$))])=V for all bidders j In this example, regardless of the environment, each bidder submits a bid equal to his private valuation.

In a second example, an English auction for the sale of an item is illustrated by the following bidding model.

$\beta_j$(V, {Format=English, Reserve Price=R}, [2, ($n_1$, $F_1$, ($a_1$, $z_1$)), ($n_2$, $F_2$, ($a_2$, $z_2$))])=V for all bidders j In this example, regardless of the environment, each bidder submits a bid equal to his private valuation.

A third example illustrates a bidding model for a sealed-bid first-price auction with preference policy for the sale of an item.

$\beta_j$(V, {Format=Sealed Bid First Price, Reserve Price=R, Bid Comparison Rule={$T_1(B)$, $T_2(B)$}, [2, ($n_1$, $F_1$, ($a_1$, $z_1$)), ($n_2$, $F_2$, ($a_2$, $z_2$,))])=$\psi_k(V)$ if j is in bidder group k (k=1,2)

The pair of functions ($\psi_1(V)$, $\psi_2(V)$) is obtained by solving a system of differential equations for the unknown functions $\phi_1(b)$ and $\phi_2(b)$ and then inverting these functions to get the bid functions $$\psi_1(V)=\phi_1^{-1}(V)$$

and $$\psi_2(V)=\phi_2^{-1}(V).$$

The following system of differential equations in the unknown functions $f_1(b)$ and $f_2(b)$ with the initial conditions $f_1(R)=f_2(R)=R$ can be solved by using any of known numerical procedures:

$$F_1(\phi_1(b))F_2(\phi_2(t(b)))=[\phi_1(b)-b]\{(n_1-1)F_2(\phi_2(\tau(b))) \\ F_1'(\phi_1(b))\phi_1'(b)+n_2F_1(\phi_1(b))F_2'(\phi_2(\tau(b)))\phi_2'(\tau(b)) \\ \tau'(b)\} \quad \text{(Eq. 1)}$$

$$F_2(\phi_2(b))F_1(\phi_1(T(b)))=[\phi_2(b)-b]\{(n_2-1(F_1(\phi_1(T(b))) \\ F_2'(\phi_2(b))\phi_2'(b)+n_1F_2(\phi_2(b))F_1'(\phi_1(T(b)))\phi_1'(T \\ (b))T'(b)\} \quad \text{(Eq. 2)}$$

where T (b)=$T_1^{-1}(T_2(b))$ and $\tau(b)=T^{-1}(b)$.

A fourth example illustrates a bidding model for sealed-bid first-price auction without preference policy for the sale of an item.

$\beta_j$(V, {Format=Sealed Bid First Price, Reserve Price=R, Bid Comparison Rule={B, B}, [2, ($n_1$, $F_1$, ($a_1$, $b_1$)), ($n_2$, $F_2$, ($a_2$, $b_2$))])=$\psi_k(V)$ if j is in bidder group k (k=1,2)

The pair of functions ($\psi_1(V)$, $\psi_2(V)$) is obtained by restricting T(b)=b in the system of differential equations described above, solving the resulting system for the unknown functions $\phi_1(b)$ and $\phi_2(b)$ with the initial conditions $\phi_1(R)=\phi_2(R)$ =R and then inverting these functions to get the bid functions $$\psi_1(V)=\phi_1^{-1}(V)$$

and $$\psi_2(V)=\phi_2^{-1}(V).$$

A fifth example illustrates that a bidding model for Dutch auction without preference policy is the same as the bidding model in Example 4 above.

A sixth example illustrates a bidding model for sealed-bid first-price auction with preference policy for the purchase of an item. In the case of auctions conducted by a buyer to purchase an item the notation V refers to the privately known cost of bidders. In a sealed-bid first-price auction for the purchase of an item the lowest bidder wins the auction and receives what he bid as payment. The bidding model for this case is as follows.

$\beta_j$(V, {Format=Sealed Bid First Price, Reserve Price=R, Bid Comparison Rule={$T_1(B)$, $T_2(B)$}, [2, ($n_1$, $F_1$, ($a_1$, $z_1$)), ($n_2$, $F_2$, ($a_2$, $z_2$))]})=$\psi_k(V)$ if j is in bidder group k (k=1,2)

The pair of functions ($\psi_1(V)$, $\psi_2(V)$) is obtained by solving a system of differential equations for the unknown functions $\phi_1(b)$ and $\phi_2(b)$ and then inverting these functions to get the bid functions $\psi_1(V)=\phi_1^{-1}(V)$ and $\psi_2(V)=\phi_2^{-1}(V)$. The following system of differential equations in the unknown functions $\phi_1(b)$ and $\phi_2(b)$ with the initial conditions $$\phi_1(R)=\phi_2(R)=R$$

is solved by using any of known numerical procedures:

$$[1-F_1(\phi_1(b))][1-F_2(\phi_2(\tau(b)))]=[b-\phi_1(b)]\{(n_1-1)[1-F_2(\phi_2(\tau(b)))]F_1'(\phi_1(b))\phi_1'(b)+n_2[1-F_1(\phi_1(b))]F_2'(\phi_2(\tau(b)))\phi_2'(t(b))t'(b)\} \quad \text{(Eq. 1')}$$

$$[1-F_2(\phi_2(b))][1-F_1(\phi_1(T(b)))]=[b-\phi_2(b)]\{(n_2-1)[1-F_1(\phi_1(T(b)))]F_2'(\phi_2(b))\phi_2'(b)+n_1[1-F_2(\phi_2(b))]F_1'(\phi_1(T(b)))\phi_1'(T(b))T'(b)\} \quad \text{(Eq. 2')}$$

where T (b)=$T_1^{-1}(T_2(b))$ and $\tau(b)=T^{-1}(b)$.

Additionally, in one embodiment, the system uses input data supplied by the user of the system. This data include, for example, a. a set of item(s) to be auctioned. (Example: {A Brand New 19 inch Ultra VGA HP Monitor, A Refurbished HP Kayak Desktop Computer with Intel Pentium III 850 Mhz, 128 M RAM, 40 G hard disk })

b. a set of valuations, one for each of the item(s) in a above representing the dollar value the seller gets if the item is not sold in this auction. (Example: {$200 for the monitor, $800 for the computer})

c. a set of constraints on the auction parameters (Examples: {Format=Sealed Bid First Price, Reserve Price=$300} for the monitor, and {Format=Sealed Bid First Price, Reserve Price=$900} for the computer d. a set of alternative preference policies to be evaluated (Example 1: {{$R_1$, $R_2$}, {$T_1(B)$, $T_2(B)$}}={{100,100}, {B, 10+x B where 1.05<x<1.20}} which represents the constraint that the bids from group 2 are transformed by multiplying the submitted bids by x and then adding $10. The value of the parameter x is to be selected subject to the constraint that it lies between 1.05 and 1.20. Example 2: {{$R_1$, $R_2$}, {$T_1(B)$, $T_2(B)$}}={{{100, 100}, {B, 1.20B}}, {{100,100},{1.20 B, B}}} represents the situation where one bidder group is to be favored by 20%. A reserve price of $100 applies to all bidders. The group that will receive the favorable treatment is to be determined. Example 3: {{$R_1$, $R_2$}, {$T_1(B)$, $T_2(B)$}}={{100, 100}, {B, H(B) where H(B)>B}} represents a situation where all bidders face a common reserve price of $100 and bidders in group 2 are favored but the form and amount of favorable treatment is to be determined.)

e. an evaluation criterion for ranking alternative preference policies (Example 1: Expected profit of the seller. Example 2: A weighted average of expected profit of the seller and expected profits of the preferred bidders.)

Exemplary Processes

FIGS. 4-9 are flowcharts 40-90, respectively, of steps performed in accordance with one embodiment of the present invention for determining an optimum market price preference policy for an auction. Flowcharts 40-90 includes processes of the present invention which, in one embodiment, are carried out by processors and electrical and electronic components under the control of computer readable and computer executable instructions. The computer readable and computer executable instructions reside, for example, in data storage features such as computer usable memory 1010 and/or processor 1050, and/or storage unit 1015 of computer system 1000 of FIG. 10. However, the computer readable and computer executable instructions may reside in any type of computer readable medium. Although specific steps are disclosed in flowcharts 40-90, such steps are exemplary. That is, the present invention is well suited to performing various other steps or variations of the steps recited in FIGS. 4-9. Within the present embodiment, it should be appreciated that the steps of flowcharts 40-90 may be performed by software, firmware, or hardware or any combination thereof.

With reference again to FIG. 1, the system includes a Historical Auction Data Repository 11, a Bidding Model Repository 12, a Structure Extractor Module 13, a Preference Policy Designer Module 14, and a Report Generator Module 15.

Figure 2:
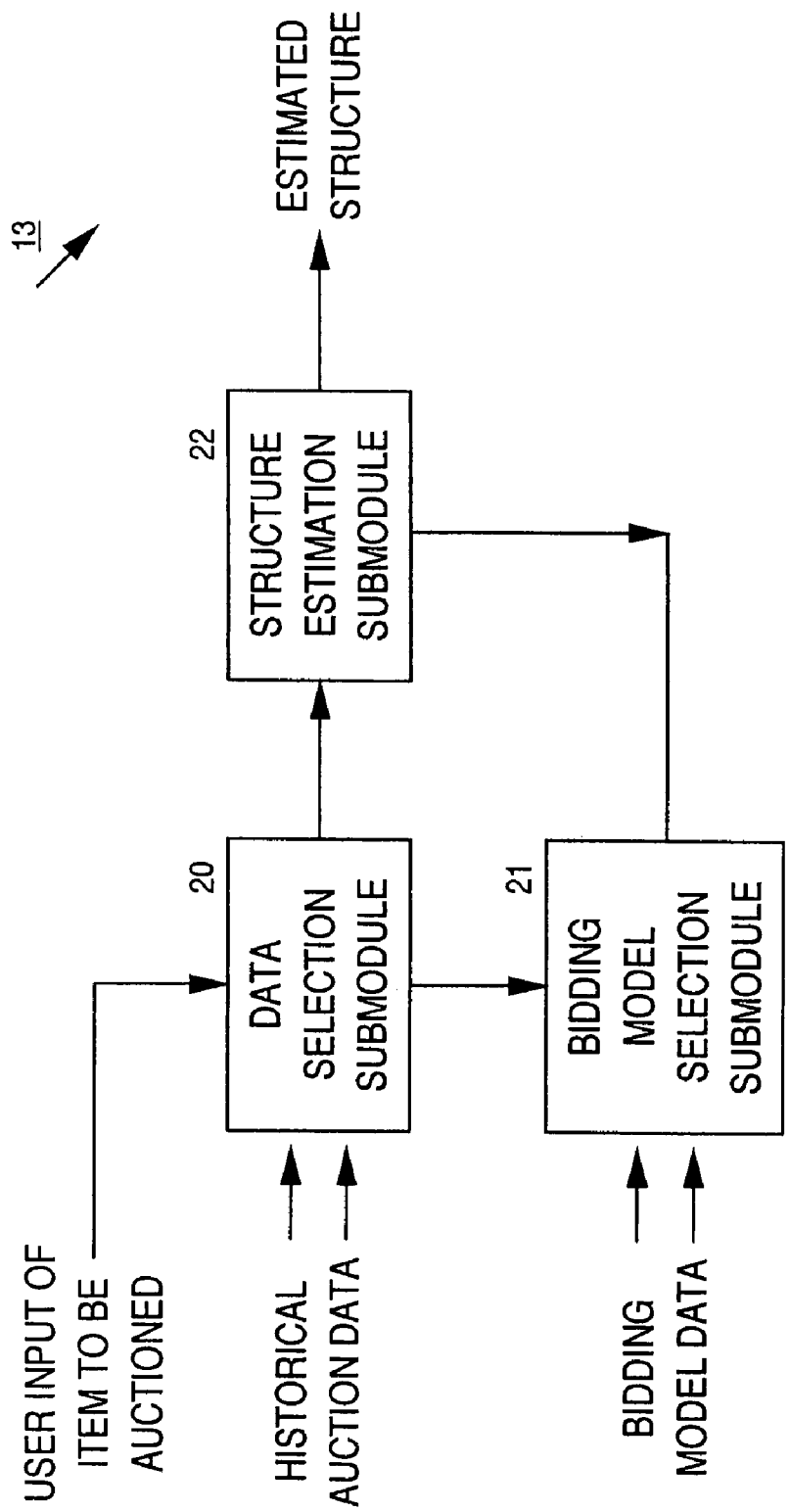
FIG. 2 shows in block diagram form the structure of the structure extractor of the decision support system of FIG. 1.

With reference to FIG. 2, Structure Extractor Module 13 has three submodules, a Data Selection Submodule 20, a Bidding Model Selection Submodule 21, and Structure Estimation Submodule 22.

Figure 3:
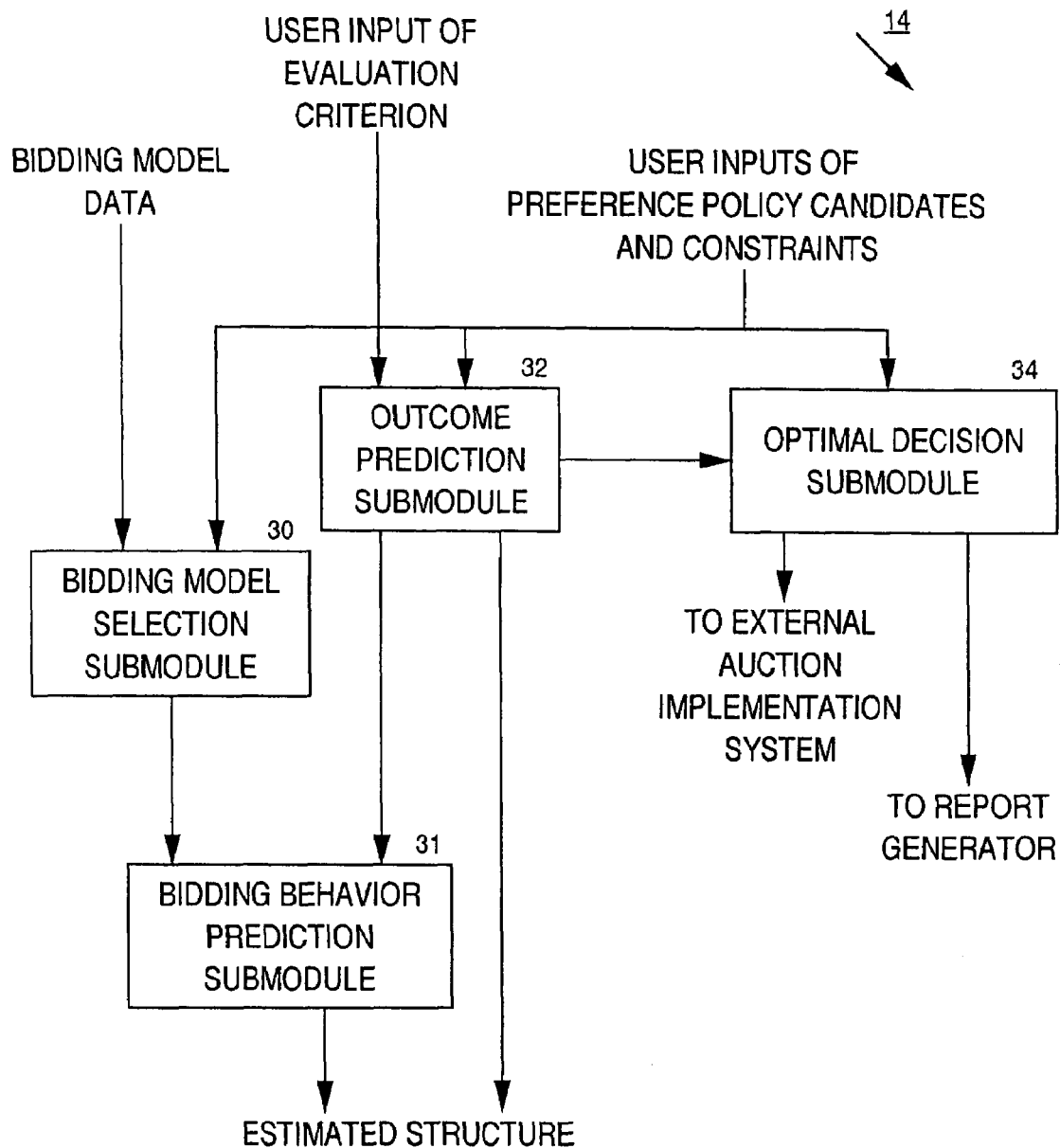
FIG. 3 shows in block diagram form the structure of the behavior predictor of the decision support system of FIG. 1.

With reference to FIG. 3, the Preference Policy Designer Module also has three submodules: a bidding Behavior Prediction Submodule 31, which receives an input from a bidding model selection submodule 30, an Outcome Prediction Submodule 32, and an Optimal Decision Submodule 34.

Structure Extractor Module 13 estimates the unobserved structural elements of the market structure. Structure Extractor 13 is connected to the Historical Auction Data Repository 11 and the Bidding Model Repository 12. Structure extractor module 13 has three submodules, a Data Selection Submodule 20, a Bidding Model Selection Submodule 21, and a Structure Estimation Submodule 22.

Referring now to FIG. 4, the steps in a process 40 effectuate a method of generating auction characteristics data, in accordance with one embodiment of the present invention. Reference is also made continually in the following discussion to elements depicted in FIGS. 1-3. Beginning with step 41, Data Selection Submodule 20 receives the user input of item(s) to be auctioned.

For each of the items specified by the user, in step 42, it then accesses the historical auction data repository 11 to extract data on auctions of similar items. The extracted records are formed into Bids Data that contain bids, bidder segment identifiers and auction mechanism characteristics.

Data Selection Submodule 20 passes the Bids Data, in step 43, to the Structure Estimation Submodule 22. Data Selection Submodule 20 passes the auction mechanism characteristics data and the bidder segment data to the Bidding Model Selection Submodule 21. Bidding Model Selection Submodule 21 computes the number of bidder segments and the number of bidders in each segment for each value of the mechanism characteristics data and retrieves the appropriate bidding model from the bidding model repository (e.g., repositories 11 or 12; FIG. 1).

As an example, suppose that historical auction data repository contains data on past auctions of the specified item. Suppose also that in all of the past auctions the bidders belong to one of two segments with 5 bidders in each segment 1 and 3 bidders in segment 2. Some of these auctions are run under English format without a reserve price and without a preference policy, and some are run under a sealed-bid first-price format with a bid comparison rule $\{T_1(B), T_2(B)\}=\{B, 1.20 B\}$, e.g., bidders in segment 2 are favored by 20%. In this example, Bidding Model Selection Module 21 retrieves two bidding models and passes to the Structure Estimation Submodule 22.

These bidding models are

MODEL 1: $\beta_j(V, \{Format=English, Reserve Price=0\}, [2, (5, F_1, (a_1, b_1)), (3, F_2, (a_2, b_2))])=V$ for all bidders j and MODEL 2: $\beta_j(V, \{Format=Sealed Bid First Price, Reserve Price=0, Bid Comparison Rule=\{B, 1.20 B\}, [2, (5, F_1, (a_1, b_1)), (3, F_2, (a_2, b_2))])=\psi_k(V)$ if j is in segment k (k=1,2) where $(\psi_1(V), \psi_2(V))$ is the obtained from the solution to the differential equation system described above.

Structure Estimation Submodule 22 first inverts the received models to express the unobserved V in terms of observed bids. In the case of English and Vickrey auctions this inversion is trivial and the unobserved valuation of bidder j is equal to his bid: $v_j=b_j$.

In the case of sealed-bid first-price auctions this inversion is achieved as follows. For a bid comparison rule $\{B, T(B)\}$, the differential equation system (Eq. 1)-(Eq. 2) above is rewritten in the following equivalent form $$V_1=\beta+[G_1(b)G_2(\tau(b))]/[(n_1-1)G_2(\tau(b))G_1'(b)+n_2G_1(b)G_2'(\tau(b))\tau'(b)] \quad (Eq. 3)$$

$$V_2=\beta+[G_2(b)G_1(T(b))]/[(n_2-1)G_1(T(b))G_2'(b)+n_1G_2(b)G_1'(T(b))T'(b)] \quad (Eq. 4)$$

where $\tau(b)=T^{-1}(b)$ and $G_1(b)$ and $G_2(b)$ are the distributions of bids for a bidder in segment 1 and segment 2, respectively. Equations (Eq. 3)-(Eq. 4) express the unobserved valuations in terms observable bid distributions of bidders in the two segments.

Structure Estimation Submodule 22 performs the following steps to estimate the unknown structural elements $F_1(V)$ and $F_2(V)$. Step 1: Obtain estimates of $G_1(b)$, $G_2(b)$, $G_1'(b)$ and $G_2'(b)$ nonparametrically by employing any of a number of known statistical estimation methods. These methods include, but are not limited to, kernel methods and local polynomial estimation methods. Denote these estimates by $\hat{G}_1(b)$, $\hat{G}_2(b)$, $\hat{G}_1'(b)$, and $\hat{G}_2'(b)$. Let $\theta_1(b)$ denote the expression on the right hand side of Eq. 3 obtained by replacing the functions $G_1(\ )$, $G_2(\ )$, $G_1'(\ )$ and $G_2'(\ )$ by their estimates $\hat{G}_1(\ ), \hat{G}_2(\ ), \hat{G}_1'(\ ),$ and $\hat{G}_2'(\ )$. Similarly, let $\theta_2(b)$ denote the expression on the right hand side of Eq. 4 obtained by the same process.

Step 2: For each bidder j obtain an estimate of his valuation $v_j$ as follows:

If bidder j is in segment 1, $v_j=\theta_1(b_j)$ where $b_j$ is the bid submitted by bidder j.

If bidder j is in segment 2, $v_j=\theta_2(b_j)$ where $b_j$ is the bid submitted by bidder j.

Step 3: Obtain estimates of the unknown structural elements $F_1(V)$ and $F_2(V)$ nonparametrically by employing any of a number of known statistical estimation methods. Let $(\hat{F}_1(V), \hat{F}_2(V))$ denote these estimates. If the elements $((a_1, z_1), (a_2, z_2))$ are unknown, the valuation estimates constructed in step 2 above can also be used to get estimates of the elements $((a_1, z_1), (a_2, z_2))$ by using any of a number of well-known statistical procedures.

In step 44, the Structure Estimation Submodule 22 outputs the estimated structure $(\hat{F}_1(V), \hat{F}_2(V))$ to the Bidding Behavior Prediction submodule 31 and Outcome Prediction submodule 32 of the Preference Policy Designer Module 14 and to the Report Generator Module 16, completing process 40.

Figure 5:
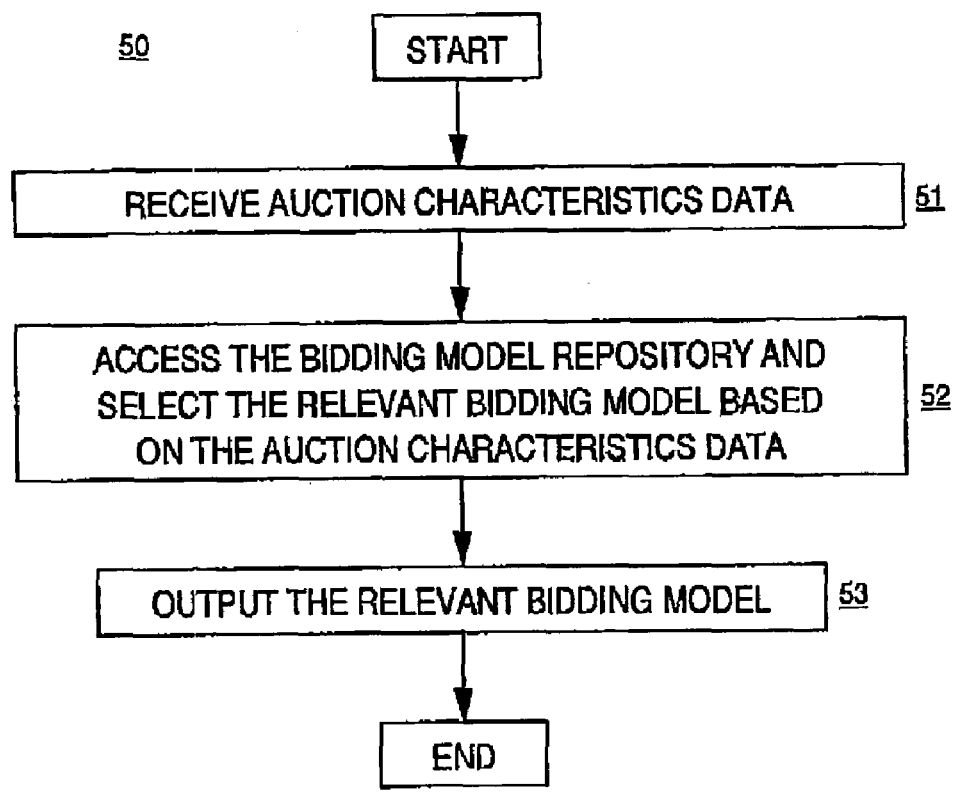
FIG. 5 is a flow chart of steps in a process for generating a relevant bidding model, in accordance with an embodiment of the present invention.

Referring now to FIG. 5, a process 50 effectuates the determination of a relevant bidding model, in accordance with one embodiment of the present invention. Reference is also made continually in the following discussion to elements depicted in FIGS. 1-3. In step 51, process 50 begins with Bidding Behavior Prediction Submodule 31 receiving auction mechanism characteristics and candidate preference policies as input.

In step 51, bidding behavior prediction module 31 passes this information to the Bidding Model Selection Submodule 21. Bidding Model Selection Submodule 21 retrieves the appropriate bidding model from the Bidding Model Repository 12. Bidding Behavior Prediction Submodule 31 also receives the estimated structure from the Structure Extractor Module 13. Predicted bidding behavior is obtained by substituting the estimated structure for the unknown elements in the retrieved bidding model.

In step 53, structure extractor module 13 outputs the predicted bidding behavior to the Outcome Prediction Submodule 32, completing process 50.

Figure 6:
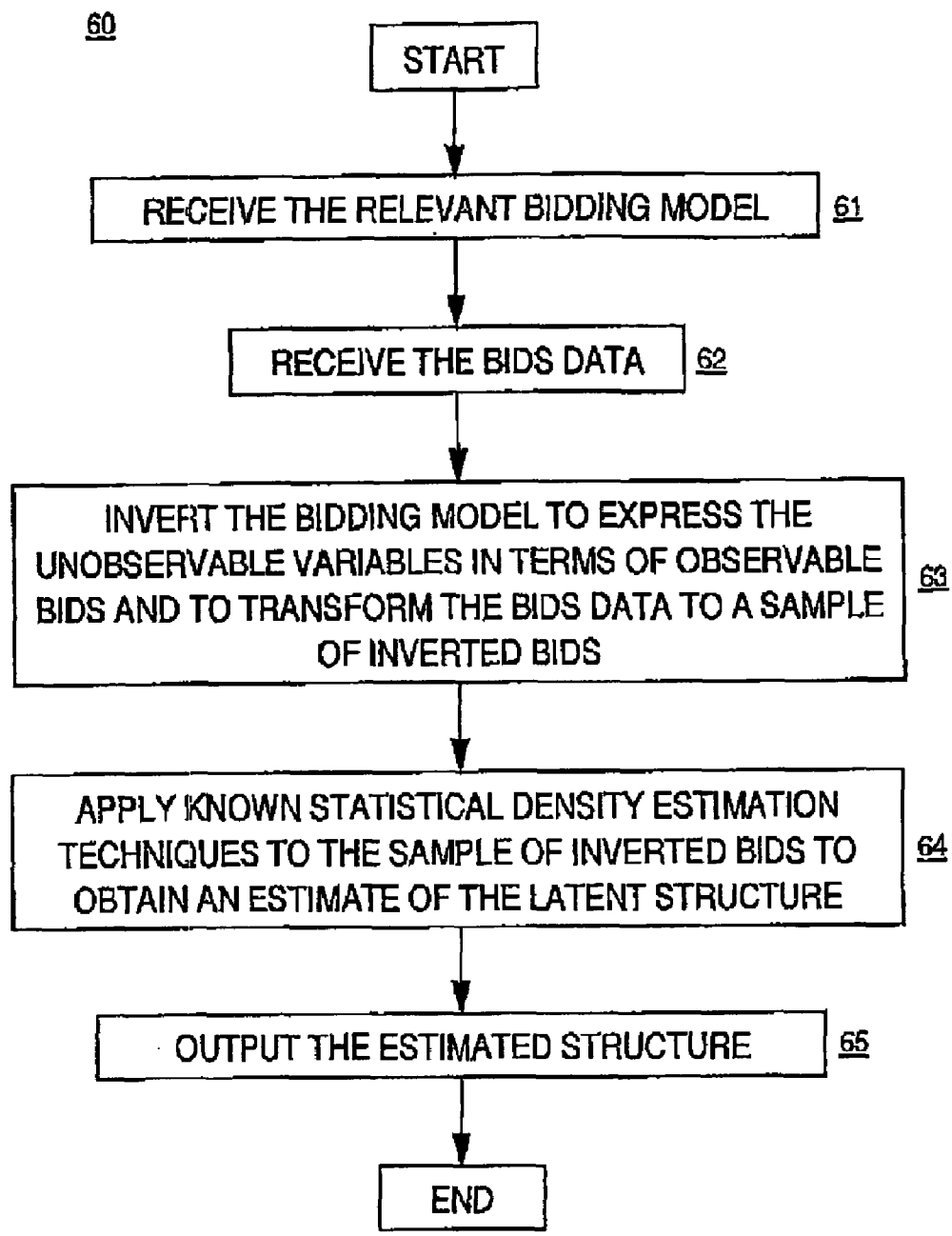
FIG. 6 is a flow chart of steps in a process for generating an estimated market structure, in accordance with an embodiment of the present invention.

The following is an exemplary application of a process 60, for determining an estimated market structure, in accordance with one embodiment of the present invention. With reference to FIG. 6 (as well as to FIGS. 1-3 for elements denoted therein), a user specifies that the auction mechanism to be used is a sealed-bid first-price auction with a reserve price of $300, a preference policy $\{B, T(B)\}$, and three (3) bidders from segment 1 and four (4) bidders from segment 2. The corresponding predicted bidding behavior, determined via process 50, is $\hat{\beta}_j(V, \{Format=Sealed Bid First Price, Reserve Price=300, Bid Comparison Rule=\{B, T(B)\}, [2, (3, (\hat{F}_1(V), (a_1, z_1)), (4, \hat{F}_2(V), (a_2, z_2))])=\psi_k(V)$ where $\psi_k(V)$ is obtained from the differential equation system described above with the initial condition $\psi_1(300)=\psi_2(300)=300$.

In step 61, the Outcome Prediction Submodule 32 receives the estimated structure $(\hat{F}_1(V), \hat{F}_2(V))$ from the Structure Estimation Submodule 22. It also receives user inputs of (1) the seller's valuation of the item, $V_s$, representing the value the seller gets if the item is not sold in this auction, (2) a set of constraints on the auction parameters, (3) a set of candidate preference policies to be evaluated, and (4) a criterion for evaluating alternative preference policy candidates; step 62.

It then passes each of the candidate preference policies, together with the auction parameters as well as the estimated structure ($F^\wedge_1(V), F^\wedge_2(V)$) to the Bidding Behavior Prediction Submodule 31 and receives predicted bidding behavior $\beta^\wedge_j(V, \ldots)$ for each of the candidate preference policy decisions. Outcome Prediction Submodule 32 then calculates the expected value of the evaluation criterion for each of the alternative preference policies by substituting the predicted bidder behavior and the estimated structural elements; step 63.

The Optimal Decision Submodule 34 receives the predicted outcome from the Outcome Prediction Submodule 32 and calculates the optimized expected value of the evaluation criterion for each of the candidate preference policies by selecting the values of the free parameters subject to the user-specified constraints; step 64. Optimum decision submodule 34 also calculates descriptive statistics (mean and variance) for the value of the evaluation criterion for each of the candidate policies and ranks the policy alternatives.

The Report Generator Module 15 receives the estimated structure from the Structure Estimation Submodule 22 and the rankings and descriptive statistics of the predicted outcome for each of the policy alternatives under consideration and presents this information in the form of a tabular and/or graphical report; step 65. Alternatively, the Optimal Decision Submodule 34 reports the configuration of the best policy alternative to an external auction implementation system specified by the user so that the specified item can be auctioned under the optimal preference policy.

Figure 7:
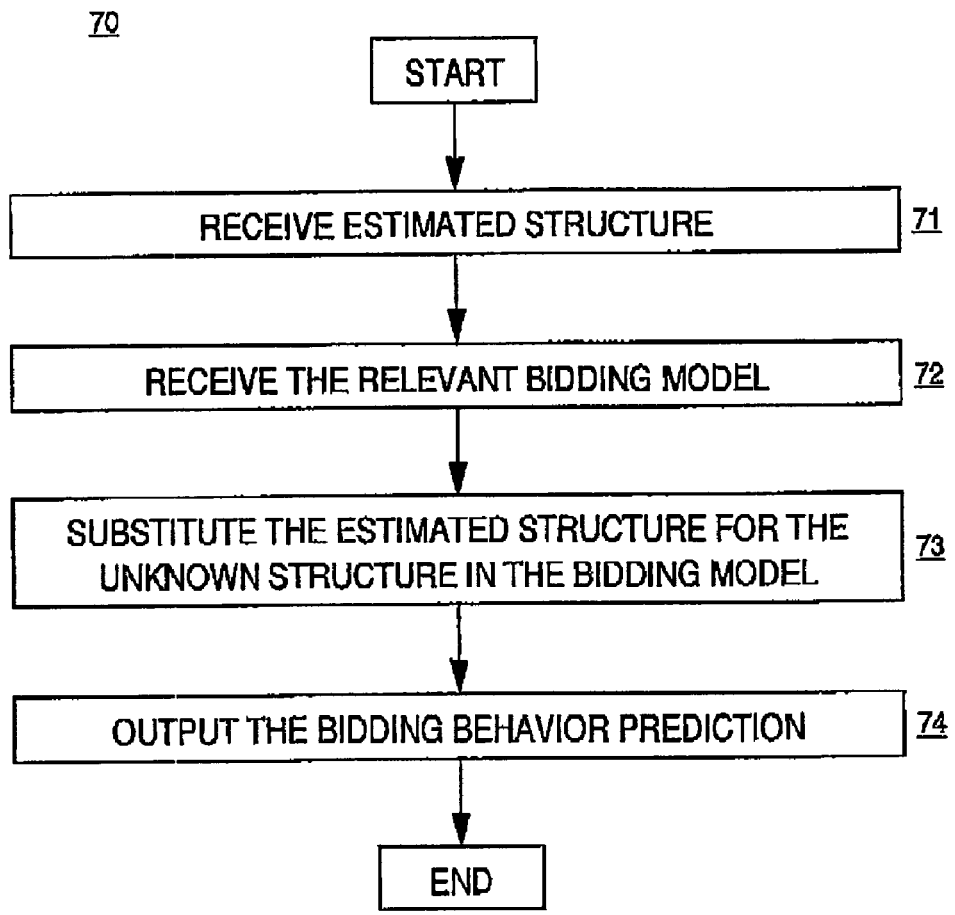
FIG. 7 is a flow chart of steps in a process for predicting bidder behavior, in accordance with an embodiment of the present invention.

Referring now to FIG. 7, the steps in a process 70 effectuate the prediction of bidding behavior, in accordance with one embodiment of the present invention. Beginning with step 71, the estimated market structure is received, as discussed above (process 60; FIG. 6).

A relevant bidding structure is received, as discussed above (process 40; FIG. 4); step 72.

In step 73, the estimated structure is substituted for unknown structure in the bidding model, as discussed above (process 40; FIG. 4).

Bidding behavior is then predicted and outputted as discussed above (process 40; FIG. 4); step 74. This completes process 70.

With reference now to FIG. 18, the steps in a process 80 determine the optimal preference policy for an auction, in accordance with one embodiment of the present invention. Beginning with step 81, user inputs are received for evaluation criteria, candidate preference policies, and constraints, as discussed above (process 60; FIG. 6).

An estimated market structure is then received as discussed above (process 60; FIG. 6); step 82.

In step 83, a candidate preference policy is selected; this is inputted for subsequent evaluation.

In step 84, a bidding behavior prediction is received, as discussed above (process 40; FIG. 4), for the candidate preference policy under the specified constraints.

In step 85, the value of the evaluation criterion is obtained, which is based upon the estimated structure, the predicted bidding behavior, the selected candidate preference policy, and the given constraints.

The value of the evaluation criterion obtained is passed to the optimal decision submodule (optimal decision submodule 34; FIG. 3).

It is decided, in step 87, if more candidate preference policies are to be evaluated. If not, process 80 is complete at this point. If it is decided that another candidate preference policy is to be evaluated, process 80, at this point, loops back to step 83 and continues repetitively.

With reference to FIG. 19, the steps in a process 90 effectuate the determination and reporting of optimal preference policies, in accordance with one embodiment of the present invention. The steps of process 90 may, in one embodiment, be performed as discussed above (processes 40-90; FIGS 4-9, respectively).

Beginning with step 91, candidate preference policies are inputted by a user.

For each candidate preference policy received for evaluation, the predicted outcome distribution is received; step 92.

The mean and variance of the outcomes for each candidate preference policy are calculated, with other desired statistical characteristics in step 93.

In step 94, the candidate preference policies are ranked, with respect to the mean of outcomes.

In step 95, the descriptive statistics and rankings of the candidate outcomes are outputted to the report generator.

The best candidate preference policy (e.g., the optimal preference policy determined by one embodiment of the present invention) is outputted to a specified auction implementation system; step 96. In one embodiment, steps 95 and 96 may be performed substantially simultaneously. In one embodiment, either step 95 or 96 may be performed without the other step. At this point, process 90 is complete.

Exemplary System Platform

Exemplary Computer System

Figure 10:
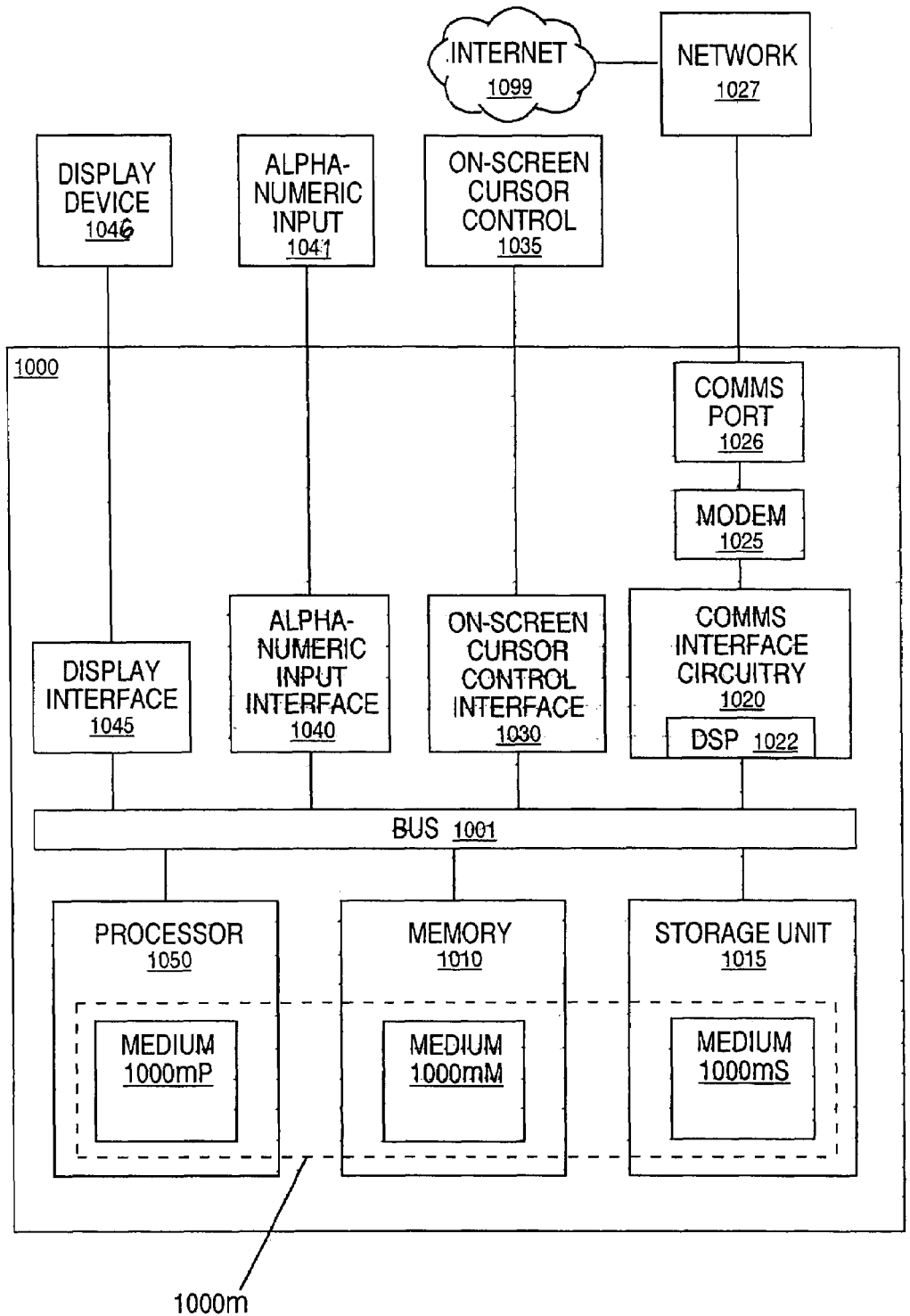
FIG. 10 is a block diagram depicting a computer system and computer readable media for implementing processes of market preference policy determination, in accordance with an embodiment of the present invention.

FIG. 10 is a block diagram depicting the In accordance with one embodiment of the present invention, a computer system 1000 and computer usable medium 1000$m$ enables the performance of a computer implemented process for setting an optimal preference policy for an auction. With reference to FIG. 10, computer system 1000 includes a bus 1001 for communicating information, a central processor 1050 coupled with the bus 1001 for processing information and instructions, and a memory unit 1010 (e.g., random access memory and/or read only memory) and a data storage system 1015 coupled with the bus 1001 for storing information and instructions. Data storage system 1015 may be any magnetic and/or optical disc and drive/reader, or any other data storage device.

In one embodiment of the present invention, the processes described, including but not limited to prompting an email user as to whether an attachment is to accompany an email message prior to transmission of the message and updating of related databases. (e.g., Process 500, FIG. 5), may be executed by processor 1050, which may an application specific integrated circuit (ASIC). Alternatively, these methods may be implemented by processor 1050 executing a program stored in memory 1010 and/or data storage system 1015. It is appreciated that computer system 1000 may implement the invention by combinations of these schemes, or by alternatives other than those pictured. It is also appreciated that computer system 1000 can include other elements not shown. It is further appreciated that computer system 1000 may be constituted by any functional equivalent, or by any viable alternative architecture.

In the present embodiment, computer system 1000 includes a communications device 1025. Communications device 1025 may be a modulator/demodulator (MODEM). Communications device 1025 enables communication via a communications port 1026.

In the present embodiment, computer system 1000 may be communicatively coupled with an external network 1027, via communications port 1026. External network 1027 may be a local area network (LAN), or any other feasible network configuration, and may include other networks including wide area networks (WAN) and the Internet 1099.

Computer system 1000 executes, in one implementation, a program embodied in a computer readable medium 1000$m$ which may be deployed in and/or to various degrees between processor 1050 (e.g., as 1000$m$P), memory 1010 (e.g., as 1000$m$M), and storage unit 1015 (e.g., as 1000$m$S). In the present implementation, execution of this program by computer system 1000 enables a process, which implements a method for analyzing new auction formats, outcomes, and rules, from limited and partially observable bidder characteristics and by utilizing any known results on some aspects of the new auction rules.

In one embodiment, bidder characteristics, auction outcomes and formats, and accompanying rules may be archived in, written to, retrieved from, and modified within a database (e.g., repositories 11 and 12; FIGS. 1 and 11). In one embodiment, the database may be deployed within computer readable medium 1000$m$.

In the present embodiment, system 1000 also optionally contains a display interface 1045 coupled to the bus 1001 for enabling incorporation of a display device 1046. Display device 1046 enables displaying information to users. In one embodiment, display interface 1045 may be a graphical user interface (GUI). In one embodiment, display interface 105 enables an auction input interface. In one embodiment, aspects of display interface 1045 may be deployed within computer readable medium 1000$m$.

System 1000 may include an alphanumeric input interface 1040 coupled to the bus 1001 for enabling incorporation of an alphanumeric input device 1041. Alphanumeric input device 1041 can communicate information and command selections to processor 1050 via alphanumeric input interface 1040 and bus 1001.

System 1000 also includes an optional cursor control or directing device (on-screen cursor control 1036) coupled to bus 1001 via on-screen cursor control interface 1030, for communicating user input information and command selections to processor 1050. In one implementation, on-screen cursor control 1036 is a mouse, trackball, joystick or special keys on alphanumeric input device 1041 capable of signaling movement of a given direction or manner of displacement.

Input interface 1040 and cursor control 1036 may both function, individually or in concert, as enabling mechanisms of a auction input.

In one embodiment, computer system 1000 may be a PC, a desktop, a laptop, or another implementation such as a mainframe or supercomputer. In another embodiment, computer system 1000 may be another computer platform, including, but not limited to PC type platforms, Macintosh, UNIX, servers, and workstations of various types. In yet another embodiment, computer system 1000 may be a portable computer platform, such as a PDA, palmtop computer, or the like. In another embodiment, system 1000 may be any other intelligent electronic system capable of implementing computer functions, such as cellular telephones, two-way pagers, other pagers, other data and communication systems, and other information processing platforms with auction capabilities.

Exemplary Database

The exemplary database herein contains information about past auctions and market participants. In one embodiment of the present invention, the following variables are observed for each auction in the database, as shown in FIG. 11. Auction data includes the auction identification and other characteristics thereof. Information about the auctioned item includes its identity, its name, quantity, description, and other attributes. The market mechanism contains data about the auction format, reserve price, preference policy, and other mechanism attributes. Bidders are identified by bidder and segment identity and other attributes. Bids are categorized y the identities of participating bidders and the bids submitted by them. Outcomes listed include assigned payments and quantities for each bidder. These are detailed in FIG. 11.

Exemplary Overall Process

Figure 12:
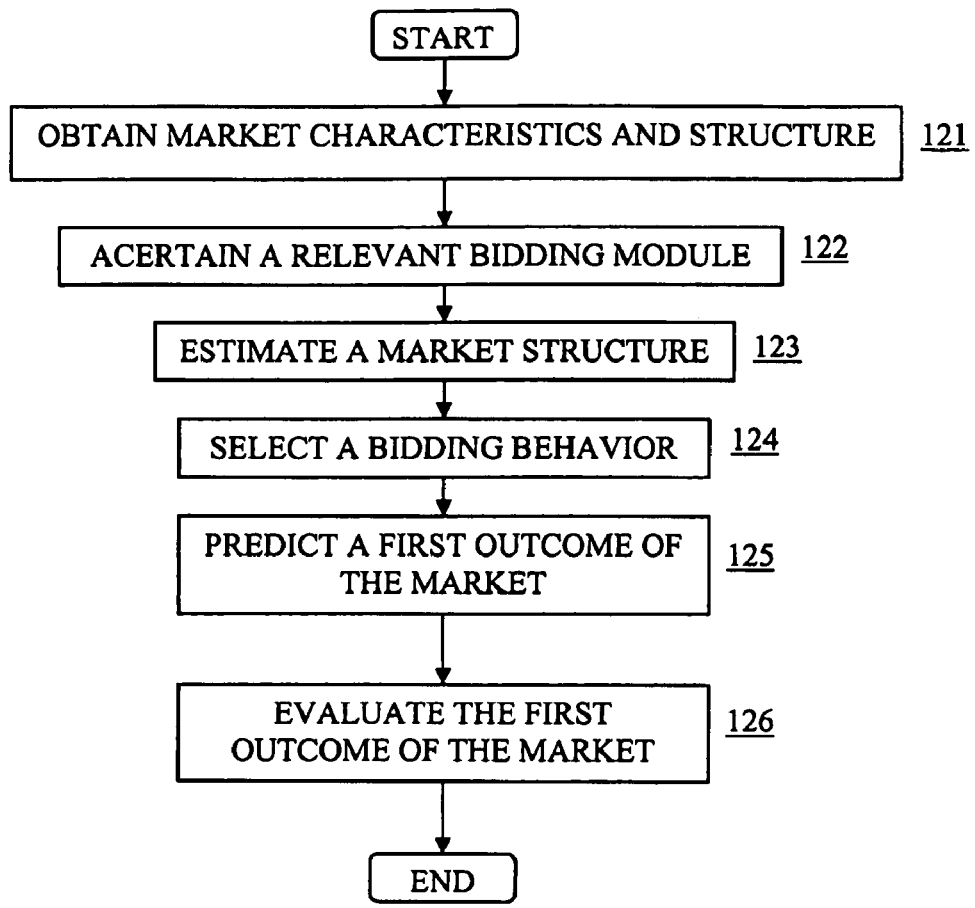
FIG. 12 is a flow chart of steps in a process for determining an optimal reserve price for an auction, in accordance with an embodiment of the present invention.

FIG. 12 illustrates the steps in a process 120 for setting an optimal preference policy for an auction market, in accordance with one embodiment of the present invention. At step 121 of process 120, characteristics of the market are selected. Step 121 is described above in detail in process 40 of FIG. 4. At step 122, a relevant bidding model is selected. Step 122 is described above in detail in process 50 of FIG. 5. At step 123, a structure of said market is estimated. Step 123 is described above in detail in process 60 of FIG. 6. At step 124, a bidding behavior is predicted. Step 124 is described above in detail in process 70 of FIG. 7. At step 125, a first outcome of the market is predicted. Step 125 is described above in detail in process 80 of FIG. 8. At step 126, the first outcome of the market is evaluated. Step 126 is described above in detail in process 90 of FIG. 9.

In summary, one embodiment of the present invention provides a method and system that determines the optimal preference policy for a market, such as an auction, with respect to a multiplicity of possible evaluation criteria that auction participants or other end users specify. In one embodiment, a method and system that configures the optimal preference policies that can be implemented in any market, particularly an auction, applicable to any auction format a market decision maker may wish to conduct. An embodiment of the present invention estimates bidders' private information and correspondingly identifies exploitable asymmetries to implement a preferential treatment policy. In one embodiment, this method is implemented on a computer system, under the control of software and firmware directing the operation of its processor and other components. In one embodiment, a computer readable medium causes a computer system to execute the method.

An embodiment of the present invention, a method and system for determining an optimal preference policy for an auction, is thus described. While the present invention has been described in particular embodiments, it should be appreciated that the present invention should not be construed as limited by such embodiments, but rather construed according to the following claims.

What is claimed is:

1. A computer implemented method for determining a preference policy for an auction to be conducted, said method comprising:

selecting characteristics of said auction to be conducted;

selecting a relevant bidding model for said auction to be conducted;

estimating a structure of said auction to be conducted, said estimating comprises expressing unobservable variables in terms of observable bids, wherein said unobservable variables are expressed in terms of observable bids by inverting said bid model;

predicting a bidding behavior for said auction to be conducted;

predicting a first outcome of said auction to be conducted; and evaluating said first outcome of said auction to be conducted, wherein said evaluating comprises:

selecting an optimal preference policy from a plurality of candidate preference policies for treating different groups of bidders differently, wherein said optimal preference policy comprises the candidate preference policy within a plurality having the highest ranking; and outputting said optimal preference policy to a participating entity in an auction, said outputting performed prior to conducting said auction.

2. The computer implemented method as recited in claim 1, wherein said selecting characteristics of said auction to be conducted further comprises:
receiving a first user input, wherein said first user input comprises information identifying an item to be auctioned;
accessing a database;
retrieving from said database historical bids data;
retrieving from said database auction characteristics data, wherein said auction characteristics comprise information relating to historical auctions of similar items;
outputting said bids data; and
outputting said auction characteristics data.

3. The computer implemented method as recited in claim 1, wherein said selecting a relevant bidding model for said auction to be conducted further comprises:
receiving said auction characteristics data;
accessing a database;
retrieving from said database a relevant bidding model, wherein said bidding model is selected based on a corresponding relevance of said auction characteristics data; and
outputting said relevant bidding model.

4. The computer implemented method as recited in claim 1, wherein said estimating a structure of said auction to be conducted further comprises:
receiving said relevant bidding model;
receiving bids data;
transforming said bids data to a sample of inverted bids, wherein said bids data are transformed by inverting said bidding model;
estimating an estimated latent structure of said market, wherein said sample of inverted bids receives application of statistical density estimation techniques to obtain said estimated structure; and
outputting said estimated structure.

5. The computer implemented method as recited in claim 1, wherein said bidding model has embedded an unknown structure, and wherein said predicting a bidding behavior for said auction to be conducted further comprises:
receiving said estimated structure;
receiving said relevant bidding model;
substituting said estimated structure for said unknown structure; and
outputting a prediction of bidding behavior.

6. The computer implemented method as recited in claim 4, wherein said predicting a first outcome of said auction to be conducted further comprises:
receiving a first user input, wherein said first user input comprises:
an evaluation criterion;
a candidate preference policy; and
a constraint;
receiving said estimated structure;
receiving said bidding behavior prediction for said candidate preference policy, wherein said bidding behavior prediction further comprises a prediction under said constraint;
obtaining a value of said evaluation criterion, wherein said value is based on said estimated structure, said bidding behavior prediction, said candidate preference policy, and said constraint, said value comprising said first predicted outcome; and
outputting said value.

7. The computer implemented method as recited in claim 6, wherein said evaluating said first outcome of said auction to be conducted further comprises:
receiving a second user input, wherein said second user input comprises a plurality of candidate preference policies;
receiving a predicted outcome for each said candidate preference policy;
calculating descriptive statistics for each said candidate preference policy, wherein said descriptive statistics comprise a mean and a variance;
ranking each said candidate preference policy with respect to said calculated mean and generating corresponding rankings for said plurality; and
outputting said descriptive statistics and said rankings.

8. A computer system comprising:
a bus;
a memory interconnected with said bus; and
a processor interconnected with said bus, wherein said processor executes a method for determining a preference policy for an auction to be conducted, said method comprising:
selecting characteristics of said auction to be conducted;
selecting a relevant bidding model for said auction to be conducted;
estimating a structure of said auction to be conducted, said estimating comprises expressing unobservable variables in terms of observable bids, wherein said unobservable variables are expressed in terms of observable bids by inverting said bid model;
predicting a bidding behavior for said auction to be conducted;
predicting a first outcome of said auction to be conducted; and
evaluating said first outcome of said auction to be conducted, wherein said evaluating comprises:
selecting an optimal preference policy from a plurality of candidate preference policies for treating different groups of bidders differently, wherein said optimal preference policy comprises the candidate preference policy within a plurality having the highest ranking; and
outputting said optimal preference policy, prior to conducting said auction, to a participant in said auction.

9. The system as recited in claim 8, wherein said selecting characteristics of said auction to be conducted further comprises:
receiving a first user input, wherein said first user input comprises information identifying an item to be auctioned;
accessing a database;
retrieving from said database historical bids data;
retrieving from said database auction characteristics data, wherein said auction characteristics comprise information relating to historical auctions of similar items;
outputting said bids data; and
outputting said auction characteristics data.

10. The system as recited in claim 8, wherein said selecting a relevant bidding model for said auction to be conducted further comprises:
receiving said auction characteristics data;
accessing a database;
retrieving from said database a relevant bidding model, wherein said bidding model is selected based on a corresponding relevance of said auction characteristics data; and
outputting said relevant bidding model.

11. The system as recited in claim 8, wherein said estimating a structure of said auction to be conducted further comprises:

receiving said relevant bidding model;
receiving bids data;
transforming said bids data to a sample of inverted bids, wherein said bids data are transformed by inverting said bid model;
estimating an estimated latent structure of said market, wherein said sample of inverted bids receives application of statistical density estimation techniques to obtain said estimated structure; and outputting said estimated structure.

12. The system as recited in claim 8, wherein said bidding model has embedded an unknown structure, and wherein said predicting a bidding behavior for said auction to be conducted further comprises:

receiving said estimated structure;
receiving said relevant bidding model;
substituting said estimated structure for said unknown structure; and outputting a prediction of bidding behavior.

13. The system as recited in claim 11, wherein said predicting a first outcome of said auction to be conducted further comprises:

receiving a first user input, wherein said first user input comprises:
an evaluation criterion;
a candidate preference policy; and
a constraint;
receiving said estimated structure;
receiving said bidding behavior prediction for said candidate preference policy, wherein said bidding behavior prediction further comprises a prediction under said constraint;
obtaining a value of said evaluation criterion, wherein said value is based on said estimated structure, said bidding behavior prediction, said candidate preference policy, and said constraint, said value comprising said first predicted outcome; and
outputting said value.

14. The system as recited in claim 13, wherein said evaluating said first outcome of said auction to be conducted further comprises:

receiving a second user input, wherein said second user input comprises a plurality of candidate preference policies;
receiving a predicted outcome for each said candidate preference policy;
calculating descriptive statistics for each said candidate preference policy, wherein said descriptive statistics comprise a mean and a variance;
ranking each said candidate preference policy with respect to said calculated mean and generating corresponding rankings for said plurality; and
outputting said descriptive statistics and said rankings.

15. A computer readable medium having encoded therein a computer readable code for causing a computer system to execute a computer implemented method for determining a preference policy for an auction to be conducted, said method comprising:

selecting characteristics of said auction to be conducted;
selecting a relevant bidding model for said auction to be conducted;
estimating a structure of said auction to be conducted, said estimating comprises expressing unobservable variables in terms of observable bids, wherein said unobservable variables are expressed in terms of observable bids by inverting said bid model;
predicting a bidding behavior for said auction to be conducted;
predicting a first outcome of said auction to be conducted; and
evaluating said first outcome of said auction to be conducted, wherein said evaluating comprises:
selecting an optimal preference policy from a plurality of candidate preference policies for treating different groups of bidders differently, wherein said optimal preference policy comprises the candidate preference policy within a plurality having the highest ranking; and
outputting said optimal preference policy to a participant in said auction, said outputting performed prior to conducting said auction.

16. The computer readable medium as recited in claim 15, wherein said selecting characteristics further comprises:

receiving a first user input, wherein said first user input comprises information identifying an item to be auctioned;
accessing a database;
retrieving from said database historical bids data;
retrieving from said database auction characteristics data, wherein said auction characteristics comprise information relating to historical auctions of similar items;
outputting said bids data; and
outputting said auction characteristics data.

17. The computer readable medium as recited in claim 15, wherein said selecting a relevant bidding model further comprises:

receiving said auction characteristics data;
accessing a database;
retrieving from said database a relevant bidding model, wherein said bidding model is selected based on a corresponding relevance of said auction characteristics data; and
outputting said relevant bidding model.

18. The computer readable medium as recited in claim 15, wherein said estimating further comprises:

receiving said relevant bidding model;
receiving bids data;
transforming said bids data to a sample of inverted bids, wherein said bids data are transformed by inverting said bid model;
estimating an estimated latent structure of said market, wherein said sample of inverted bids receives application of statistical density estimation techniques to obtain said estimated structure; and
outputting said estimated structure.

19. The computer readable medium as recited in claim 15, wherein said bidding model has embedded an unknown structure, and wherein said predicting a bidding behavior further comprises:

receiving said estimated structure;
receiving said relevant bidding model;
substituting said estimated structure for said unknown structure; and
outputting a prediction of bidding behavior.

20. The computer readable medium as recited in claim 18, wherein said predicting a first outcome further comprises:

receiving a first user input, wherein said first user input comprises:
an evaluation criterion;
a candidate preference policy; and a constraint;

receiving said estimated structure;

receiving said bidding behavior prediction for said candidate preference policy, wherein said bidding behavior prediction further comprises a prediction under said constraint;

obtaining a value of said evaluation criterion, wherein said value is based on said estimated structure, said bidding behavior prediction, said candidate preference policy, and said constraint, said value comprising said first predicted outcome; and outputting said value.

21. The computer readable medium as recited in claim 20, wherein said evaluating said first outcome further comprises:

receiving a second user input, wherein said second user input comprises a plurality of candidate preference policies;

receiving a predicted outcome for each said candidate preference policy;

calculating descriptive statistics for each said candidate preference policy, wherein said descriptive statistics comprise a mean and a variance;

ranking each said candidate preference policy with respect to said calculated mean and generating corresponding rankings for said plurality; and outputting said descriptive statistics and said rankings.

* * * * *

UNITED STATES PATENT AND TRADEMARK OFFICE
CERTIFICATE OF CORRECTION

PATENT NO.       : 7,403,911 B2
APPLICATION NO.  : 09/902880
DATED            : July 22, 2008
INVENTOR(S)      : Kemal Guler et al.

It is certified that error appears in the above-identified patent and that said Letters Patent is hereby corrected as shown below:

In column 2, line 26, delete "systemic" and insert -- systematic --, therefor.

In column 2, line 55, after "conducting" insert -- an auction --.

In column 3, line 39, delete "at" and insert -- art --, therefor.

In column 10, line 22, delete "$n_l$" and insert -- $n_1$ --, therefor.

In column 12, line 57, in equation 2, delete " $\{(n_2-1(F_1(\phi_1(T(b)))$ " and insert -- $\{(n_2-1)F_1(\phi_1(T(b)))\}$ --, therefor.

In column 13, line 51, delete "128 M" and insert -- 128MB --, therefor.

In column 13, line 51, delete "40 G" and insert -- 40GB --, therefor.

In column 14, line 47, after "Module" insert -- 14 --.

In column 15, line 14, insert -- 11 -- before "contains".

In column 15, line 53, after "terms" insert -- of --.

In column 16, line 19, delete "16" and insert -- 15 --, therefor.

Figure 8:
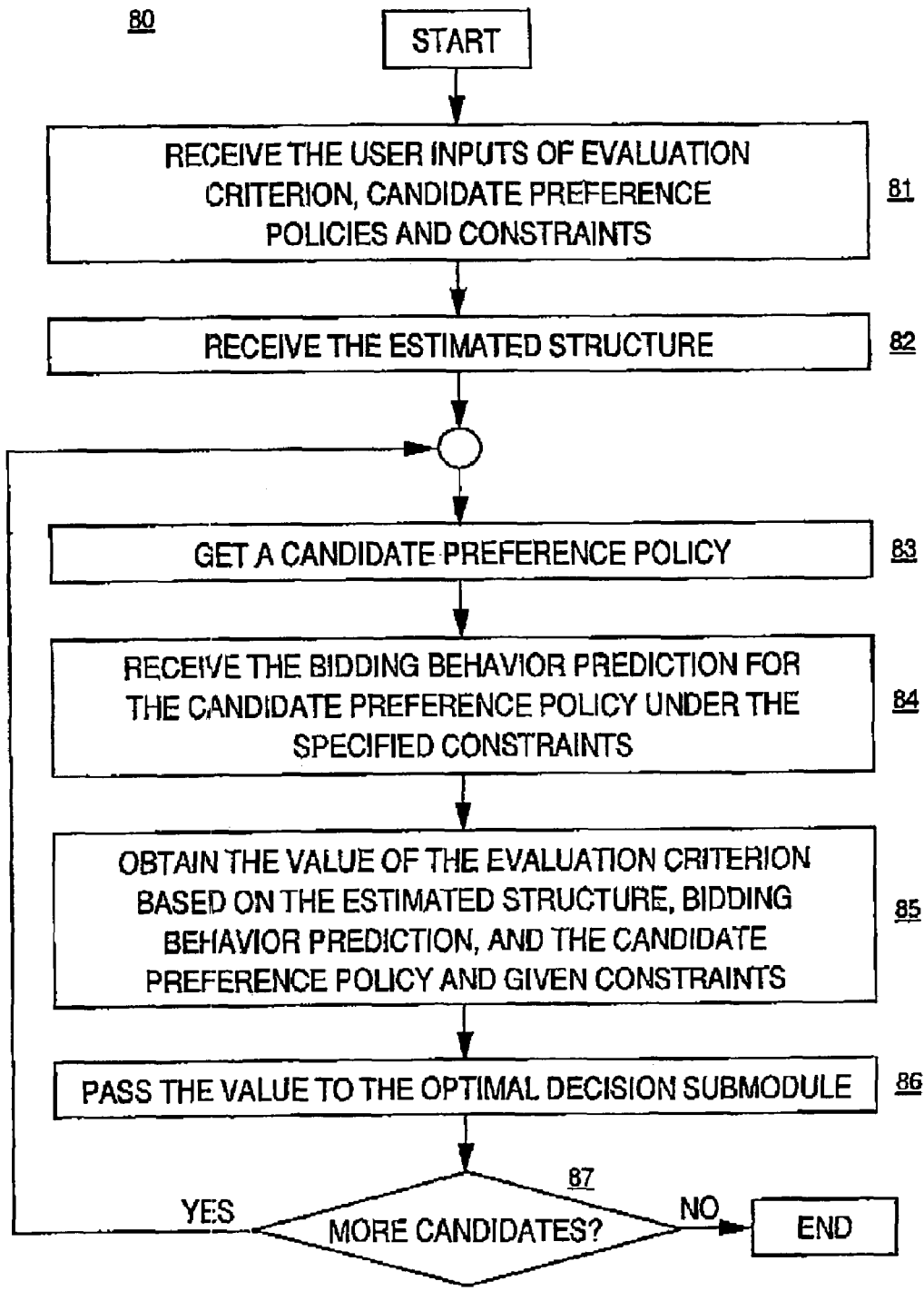
FIG. 8 is a flow chart of steps in a process for determining an optimal preference policy, in accordance with an embodiment of the present invention.

In column 17, line 41, delete "FIG. 18" and insert -- FIG. 8 --, therefor.

In column 17, line 58, delete "The" and insert -- In step 86, the --, therefor.

Figure 9:
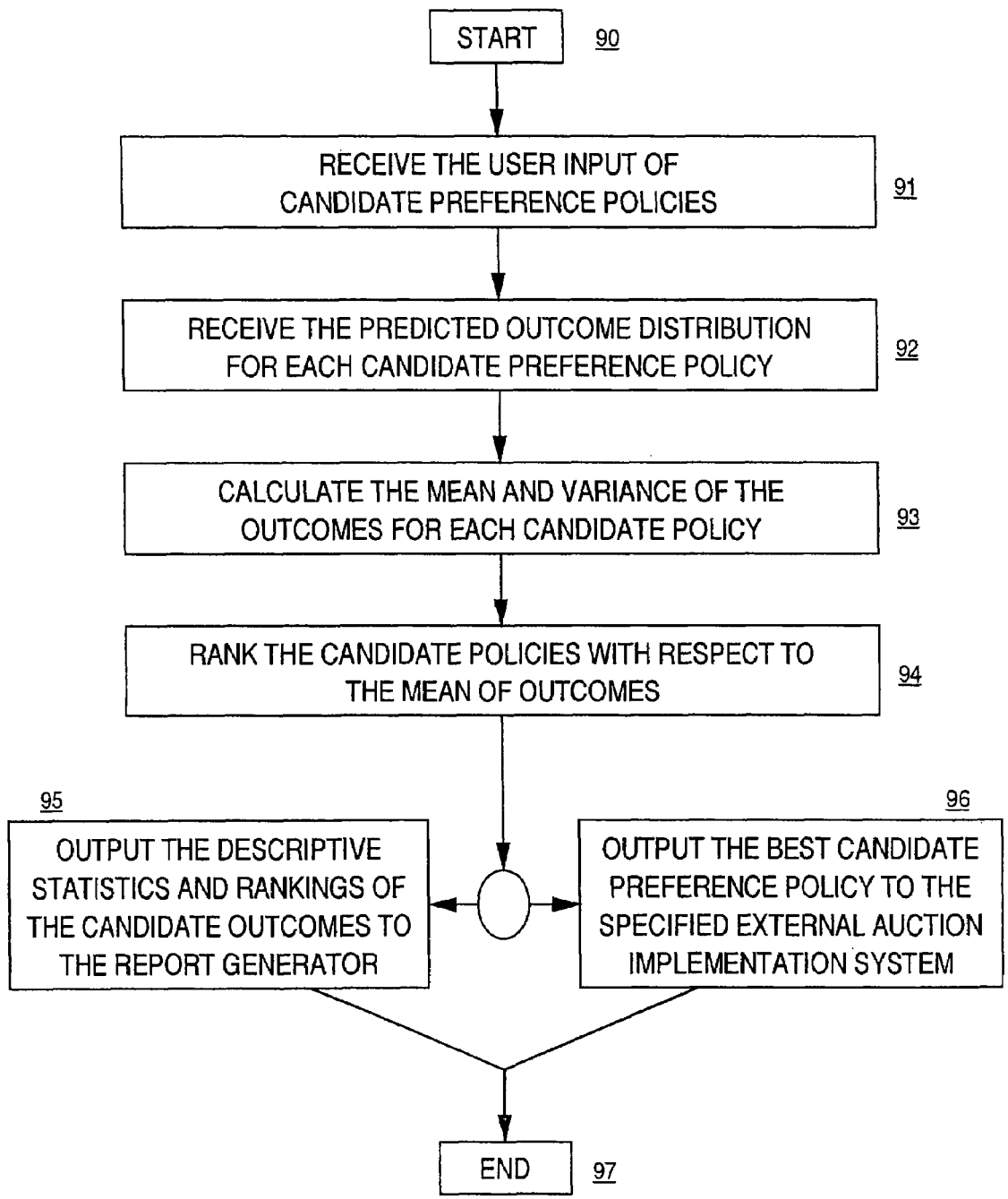
FIG. 9 is a flow chart of steps in a process for reporting preference policy ranking, in accordance with an embodiment of the present invention.

In column 17, line 66, delete "FIG. 19" and insert -- FIG. 9 --, therefor.

UNITED STATES PATENT AND TRADEMARK OFFICE
CERTIFICATE OF CORRECTION

PATENT NO.         : 7,403,911 B2
APPLICATION NO.    : 09/902880
DATED              : July 22, 2008
INVENTOR(S)        : Kemal Guler et al.

It is certified that error appears in the above-identified patent and that said Letters Patent is hereby corrected as shown below:

In column 19, line 21, delete "105" and insert -- 1045 --, therefor.

In column 19, line 32, delete "1036" and insert -- 1035 --, therefor.

In column 19, line 36, delete "1036" and insert -- 1035 --, therefor.

In column 19, line 39, delete "1036" and insert -- 1035 --, therefor.

Signed and Sealed this

Fifth Day of May, 2009

JOHN DOLL
*Acting Director of the United States Patent and Trademark Office*